United States Patent
Konishi et al.

(10) Patent No.: US 9,337,922 B2
(45) Date of Patent: May 10, 2016

(54) WAVEFORM RECONSTRUCTION DEVICE, WAVEFORM RECONSTRUCTION SYSTEM, AND WAVEFORM RECONSTRUCTION METHOD

(71) Applicant: OSAKA UNIVERSITY, Osaka (JP)

(72) Inventors: Tsuyoshi Konishi, Osaka (JP); Koji Takahashi, Osaka (JP); Tomotaka Nagashima, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 92 days.

(21) Appl. No.: 14/379,806

(22) PCT Filed: Feb. 6, 2013

(86) PCT No.: PCT/JP2013/000647
§ 371 (c)(1),
(2) Date: Aug. 20, 2014

(87) PCT Pub. No.: WO2013/125166
PCT Pub. Date: Aug. 29, 2013

(65) Prior Publication Data
US 2015/0010303 A1 Jan. 8, 2015

(30) Foreign Application Priority Data
Feb. 20, 2012 (JP) .................... 2012-034442

(51) Int. Cl.
*H04B 10/00* (2013.01)
*H04B 10/079* (2013.01)
(Continued)

(52) U.S. Cl.
CPC ........... *H04B 10/07955* (2013.01); *G01J 11/00* (2013.01); *H04B 10/25* (2013.01)

(58) Field of Classification Search
CPC .... H04B 10/07955; H04B 10/25; G01J 11/00
See application file for complete search history.

(56) References Cited

U.S. PATENT DOCUMENTS 6,229,631 B1 * 5/2001 Sato .................... H04B 10/0775
398/147
7,848,647 B2 * 12/2010 Watanabe ............... H04J 14/08
359/330

(Continued)

FOREIGN PATENT DOCUMENTS

WO 2010/100891 9/2010

OTHER PUBLICATIONS

International Search Report issued Mar. 5, 2013 in International (PCT) Application No. PCT/JP2013/000647.

(Continued)

*Primary Examiner* — Danny Leung
(74) *Attorney, Agent, or Firm* — Wenderoth, Lind & Ponack, L.L.P.

(57) ABSTRACT

A waveform reconstruction device (140) includes: a phase-spectrum calculation unit (143) which (i) simulates, for each intensity of an input optical signal assumed to have a given phase spectrum, propagation of the input optical signal through an optical transmission medium, to calculate a power spectrum of an output optical signal, and (ii) performs iterations of simulating the propagation while changing the given phase spectrum to reduce differences between calculated power spectra and measured power spectra of the input optical signal having the intensities, to search for a phase spectrum of the input optical signal; and a waveform reconstruction unit (144) which reconstructs a time waveform of the input optical signal using the phase spectrum found through the search, wherein the phase-spectrum calculation unit (143) changes the given phase spectrum or simulates the propagation, based on a nonlinear optical effect or a dispersion effect.

12 Claims, 13 Drawing Sheets

(51) Int. Cl.
*G01J 11/00* (2006.01)
*H04B 10/25* (2013.01)

(56) References Cited

U.S. PATENT DOCUMENTS

| | | | | |
|---|---|---|---|---|
| 8,311,410 | B2* | 11/2012 | Watanabe | H04B 10/07953 359/330 |
| 8,886,037 | B2* | 11/2014 | Konishi | G01J 3/02 398/13 |
| 2005/0219543 | A1* | 10/2005 | Uehara | G01J 11/00 356/450 |
| 2006/0051100 | A1* | 3/2006 | Watanabe | H04B 10/07953 398/152 |
| 2006/0056468 | A1* | 3/2006 | Dantus | G01J 11/00 372/28 |
| 2011/0044684 | A1* | 2/2011 | Watanabe | H04J 14/08 398/9 |
| 2011/0311223 | A1* | 12/2011 | Konishi | G01J 3/02 398/38 |
| 2014/0043674 | A1* | 2/2014 | Takasaka | H04B 10/294 359/334 |
| 2015/0010303 | A1* | 1/2015 | Konishi | G01J 11/00 398/38 |

OTHER PUBLICATIONS

D.J. Kane et al., "Characterization of Arbitrary Femtosecond Pulses Using Frequency-Resolved Optical Gating", IEEE Journal of Quantum Electronics, vol. 29, No. 2, Feb. 1993, pp. 571 to 579.
C. Dorrer et al., "Characterization of the Spectral Phase of Ultrashort Light Pulses", C. R. Acad. Sci. Paris, vol. 2, 2001, pp. 1415-1426.
A. Sullivan et al., "Quantitative Investigation of Optical Phase-Measuring Techniques for Ultrashort Pulse Lasers", Journal of the Optical Society of America B, vol. 13, Issue 9, Sep. 1996, pp. 1965-1978.
Extended European Search Report issued Oct. 12, 2015 in corresponding European patent application No. 13 75 1849.
Kenneth W. Delong et al., "Improved ultrashort pulse-retrieval algorithm for frequency-resolved optical gating", Journal of the Optical Society of America A, Optical Society of America, US, vol. 11, No. 9, Sep. 1, 1994, pp. 2429-2437, XP008013235.

* cited by examiner

FIG. 12
(a)
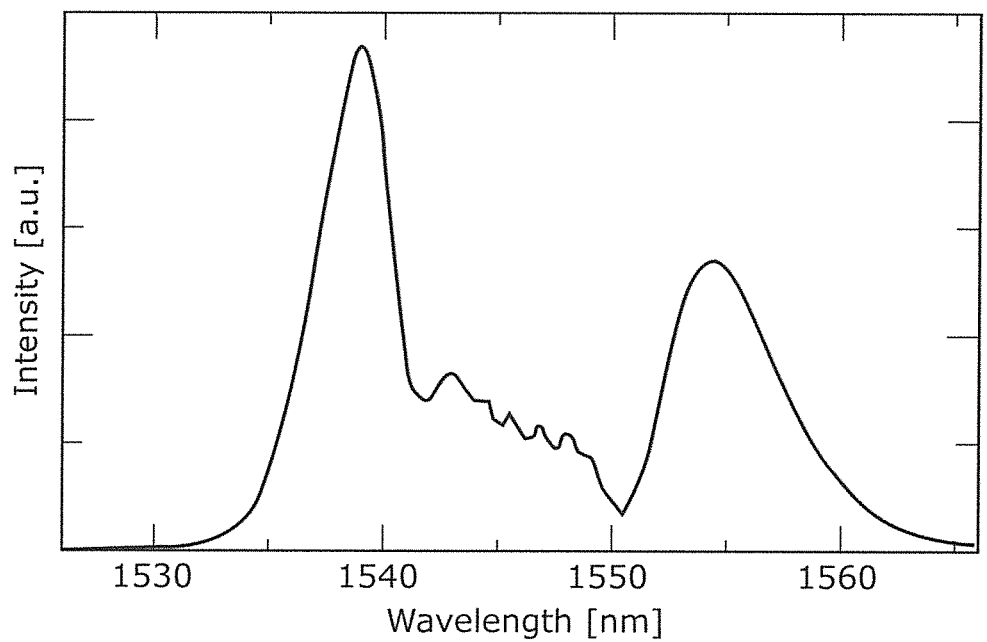
(b)
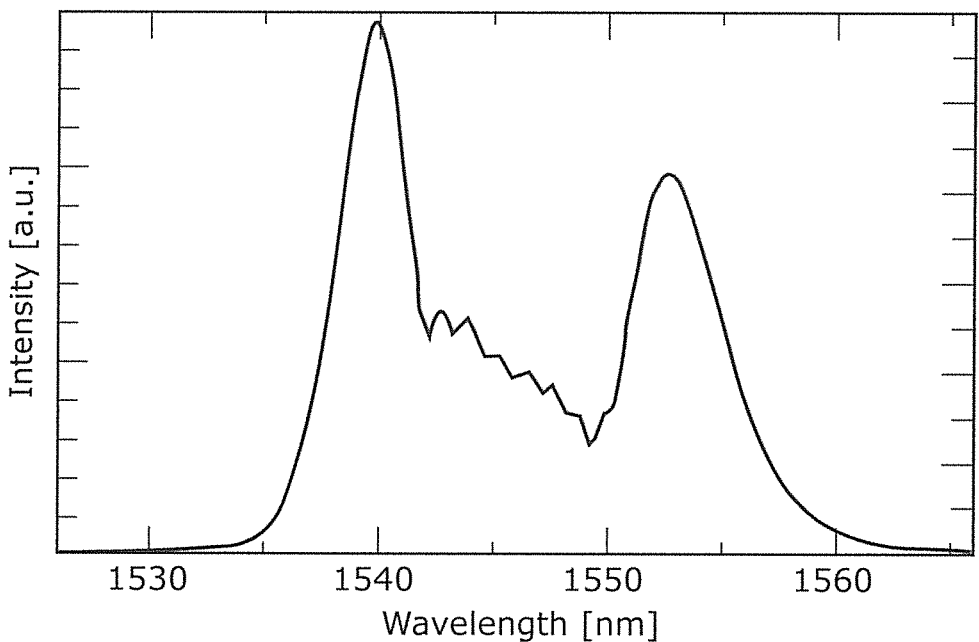

FIG. 13
(a)
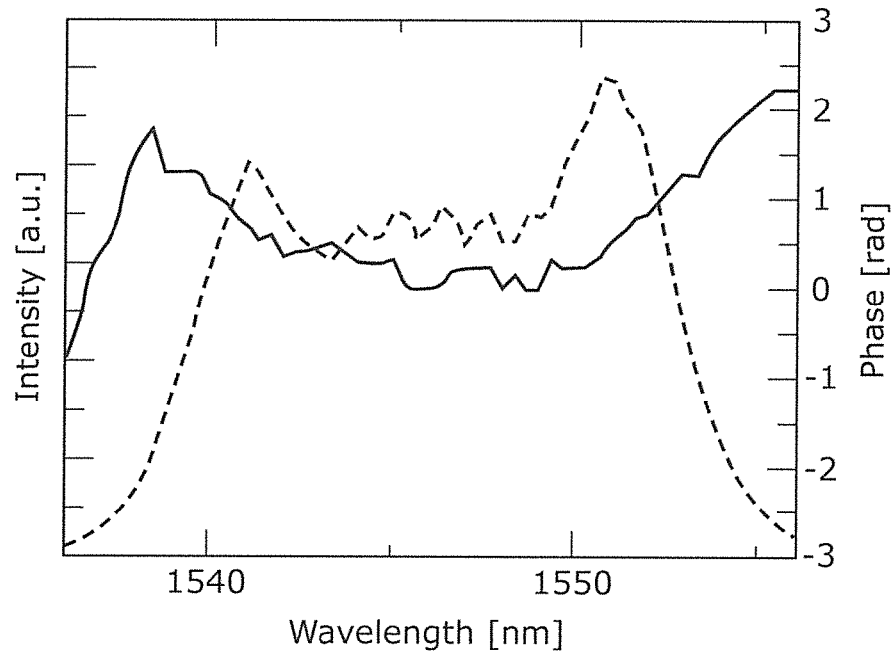
(b)
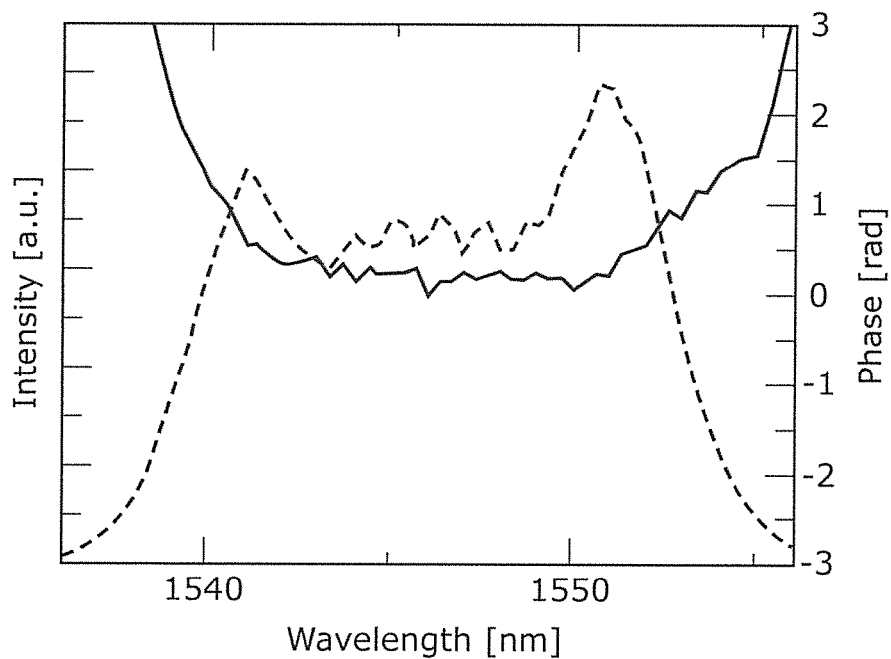

FIG. 14
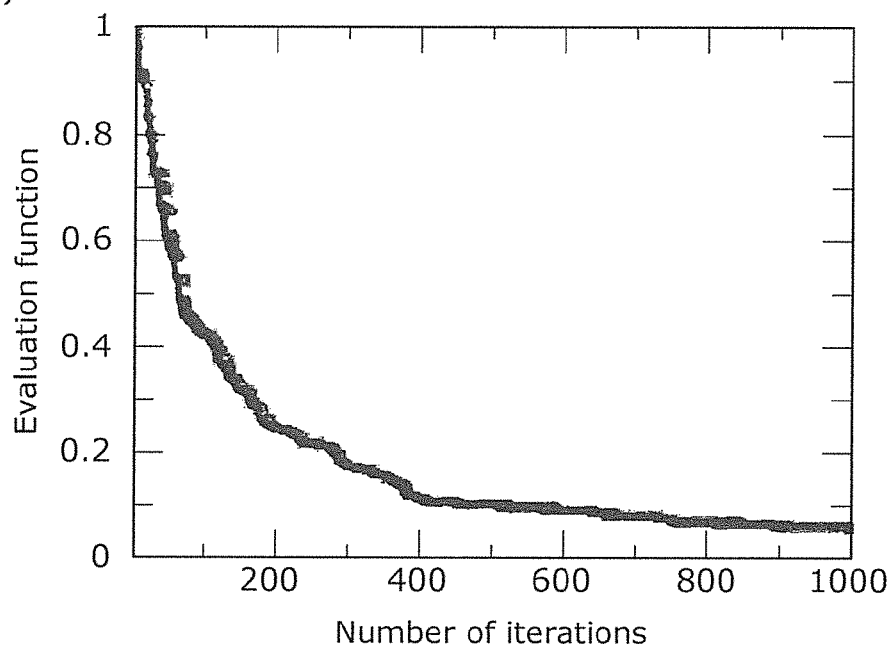
(a)
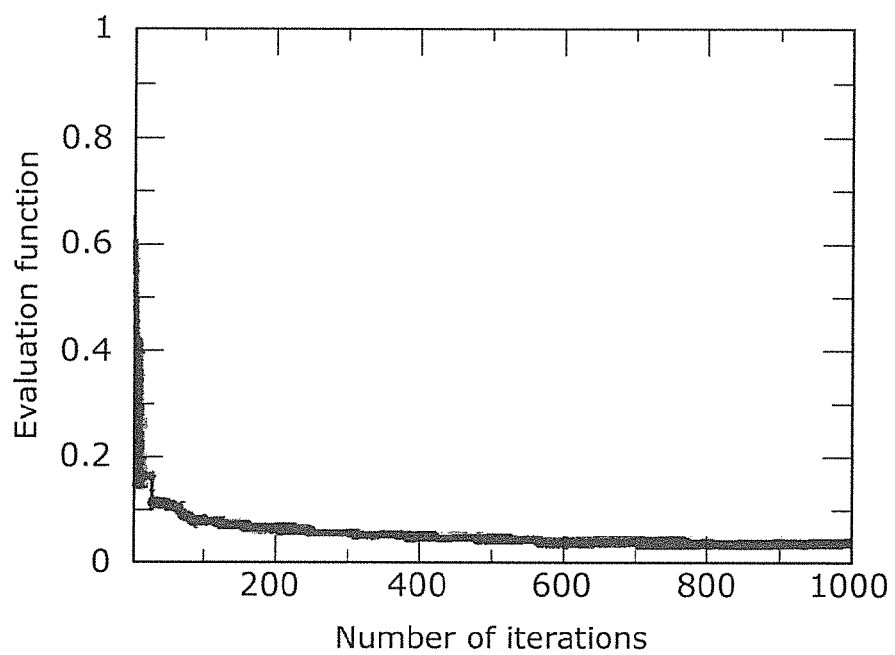
(b)

FIG. 15
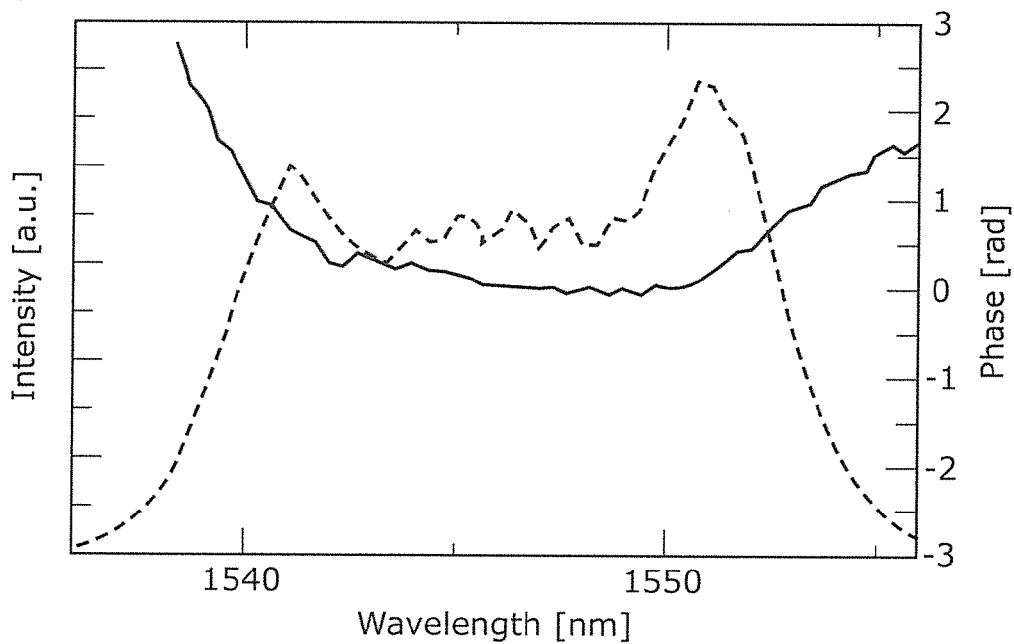
(a)
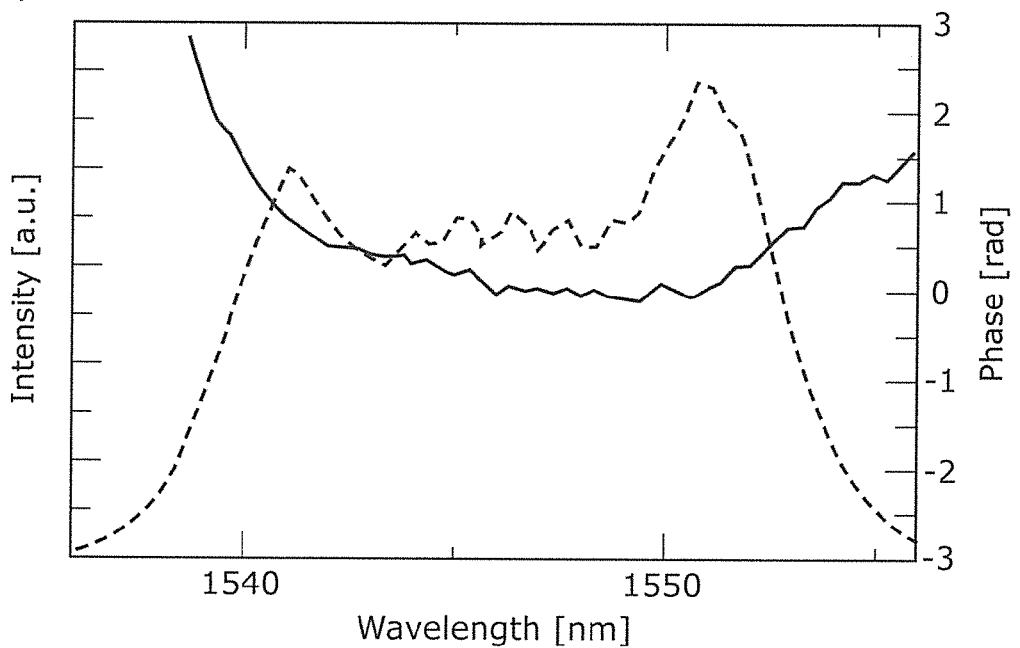
(b)

WAVEFORM RECONSTRUCTION DEVICE, WAVEFORM RECONSTRUCTION SYSTEM, AND WAVEFORM RECONSTRUCTION METHOD

TECHNICAL FIELD

The present invention relates to a waveform reconstruction device and the like which reconstruct a time waveform of an optical signal.

BACKGROUND ART

Recently, it is extremely important to obtain information on an accurate time waveform of an optical signal, in order to put into practical use, for instance, an information communication system using nonlinear optical effects. Now, an intensity distribution of an optical signal is measured using an optical sampling oscilloscope, an auto correlator, and the like, in order to obtain information on accurate time waveforms of the optical signal. As a result, amplitude information of the optical signal is obtained from the measured intensity distribution. However, phase information of the optical signal cannot be obtained from the measured intensity distribution. Specifically, information on a time waveform of the optical signal cannot be obtained by merely measuring the intensity distribution of the optical signal.

Now, various methods for obtaining a phase of an optical signal have been proposed (see Non-Patent Literatures (NPLs) 1 and 2, for example). The methods disclosed in NPLs 1 and 2 are methods for obtaining a phase of an optical signal based on time-resolved spectroscopy. Specifically, according to the methods disclosed in NPLs 1 and 2, a phase of an optical signal is obtained using an ultra high-speed time gate or a reference light source. Then, a time waveform of an optical signal is reconstructed using the obtained phase.

CITATION LIST

Non Patent Literature

[NPL 1] D. J. Kane, R. Trebino, "Characterization of arbitrary femtosecond pulses using frequency-resolved optical gating", IEEE Journal of Quantum Electronics, Vol. 29, 1993, pp. 571 to 579
[NPL 2] C. Dorrer, M. Joffre, "Characterization of the spectral phase of ultrashort light pulses", C. R. Acad. Sci. Paris, Vol. 2, 2001, p. 1415

SUMMARY OF INVENTION

Technical Problem

However, the above conventional methods require an extremely high technical level such as time adjustment for an optical signal and a gate, stability, and securing a signal-noise (SN) ratio, and the like, due to the need of an ultra high-speed time gate or a reference light source.

In view of this, the present invention provides a waveform reconstruction device which can reconstruct a time waveform of an optical signal in a simplified manner.

Solution to Problem

A waveform reconstruction device according to an aspect of the present invention is a waveform reconstruction device which reconstructs a time waveform of an input optical signal, the waveform reconstruction device including: an input-spectrum obtaining unit configured to obtain information indicating a power spectrum of the input optical signal; an output-spectrum obtaining unit configured to obtain, for each of intensities of the input optical signal, a measured power spectrum which is obtained by measuring an output optical signal that is the input optical signal output after having propagated through an optical transmission medium having a nonlinear optical effect; a phase-spectrum calculation unit configured to (i) simulate, for each of the intensities of the input optical signal where the input optical signal is assumed to have a given phase spectrum, propagation of the input optical signal through the optical transmission medium, to calculate a power spectrum of the output optical signal, and (ii) simulate the propagation to make a search for a phase spectrum of the input optical signal while changing the given phase spectrum to reduce differences between the calculated power spectra and the measured power spectra of the input optical signal having the intensities; and a waveform reconstruction unit configured to perform frequency-time transform on the phase spectrum found through the search by the phase-spectrum calculation unit and the power spectrum indicated in the information obtained by the input-spectrum obtaining unit, to reconstruct the time waveform of the input optical signal, wherein the phase-spectrum calculation unit is configured to change the given phase spectrum or simulate the propagation, based on one of a nonlinear optical effect and a dispersion effect.

This configuration allows reconstruction of a time waveform of an input optical signal using a power spectrum of an output optical signal that is the input optical signal output after having propagated through an optical transmission medium having a nonlinear optical effect. Thus, if the power spectrum is successfully measured, the time waveform of the input optical signal can be reconstructed, which allows the time waveform of an optical signal to be reconstructed in a simplified manner. Furthermore, a given phase spectrum can be changed or propagation can be simulated, based on only one of a nonlinear optical effect or a dispersion effect. Thus, a time for searching for a phase spectrum can be reduced compared to the case where propagation is simulated or a given phase spectrum is changed, based on or not based on both a nonlinear optical effect and a dispersion effect.

For example, the phase-spectrum calculation unit may be configured to change the given phase spectrum in accordance with a constraint on the phase spectrum that is to be satisfied when the input optical signal is assumed to be a resultant signal that has propagated through a medium having only the dispersion effect out of the nonlinear optical effect and the dispersion effect.

This configuration allows a given phase spectrum to be changed in accordance with an appropriate constraint. Consequently, the number of variables can be decreased in the search for a phase spectrum, which allows a reduction in a search time.

For example, when making the search for the phase spectrum of the input optical signal, the phase-spectrum calculation unit may be configured to change the given phase spectrum in accordance with the constraint and simulate the propagation, and subsequently change the given phase spectrum independently of the constraint and simulate the propagation.

This configuration allows a given phase spectrum to be changed independently of the constraint, after changing the given phase spectrum in accordance with the constraint. Consequently, in the search for a phase spectrum, a search time can be reduced while avoiding a fall in search accuracy.

For example, the phase-spectrum calculation unit may be configured to simulate the propagation using only one or more parameters for the nonlinear optical effect out of the nonlinear optical effect and the dispersion effect.

This configuration allows simulation of propagation using only one or more parameters for a nonlinear optical effect, out of the nonlinear optical effect and the dispersion effect. Consequently, propagation simulation is simplified, which can increase the calculation speed.

For example, the phase-spectrum calculation unit may be configured to simulate the propagation using only a parameter for self-phase modulation among the one or more parameters for the nonlinear optical effect.

This configuration allows simulation of propagation using only a parameter for self-phase modulation among the one or more parameters for the nonlinear optical effect. Consequently, propagation simulation is further simplified, which can further increase the calculation speed.

For example, the optical transmission medium may be an optical fiber.

This configuration allows the optical transmission medium having a nonlinear optical effect to have a simple configuration.

A waveform reconstruction system according to an aspect of the present invention is a waveform reconstruction system for reconstructing a time waveform of an input optical signal, the waveform reconstruction system including: an intensity adjuster which changes an intensity of the input optical signal to different intensities; an optical transmission medium which has a nonlinear optical effect, and at least a parameter of which for the nonlinear optical effect is known; a spectrum measuring device which measures, for each of the intensities of the input optical signal changed by the intensity adjuster, a power spectrum of an output optical signal that is the input optical signal output after having propagated through the optical transmission medium; and the waveform reconstruction device, wherein the output-spectrum obtaining unit is configured to obtain a measured power spectrum which is the power spectrum measured by the spectrum measuring device.

This configuration allows reconstruction of the time waveform of an input optical signal if an optical transmission medium having a known parameter for a nonlinear optical effect and a spectrum measuring device are provided, and simple reconstruction of a time waveform of an optical signal. Furthermore, a given phase spectrum can be changed or propagation can be simulated, based on only one of a nonlinear optical effect and a dispersion effect. Thus, a time for searching for a phase spectrum can be reduced compared to the case where propagation is simulated or a given phase spectrum is changed, based on or not based on both a nonlinear optical effect and a dispersion effect.

The optical transmission medium may be an optical fiber.

This configuration allows the optical transmission medium having a nonlinear optical effect to have a simple configuration.

It should be noted that these general and specific aspects may be implemented using a system, a method, an integrated circuit, a computer program, a computer-readable recording medium such as a CD-ROM, or any combination of systems, methods, integrated circuits, computer programs, or recording media.

Advantageous Effects of Invention

As is clear from the above description, a time waveform of an optical signal can be reconstructed in a simplified manner, according to an aspect of the present invention.

BRIEF DESCRIPTION OF DRAWINGS

FIG. 12 illustrates graphs showing power spectra measured by a spectroscope after an input optical signal having two intensities propagates through a high nonlinear optical fiber, in the experiment of the variation of Embodiment 2.

FIG. 13 illustrates experimental results obtained by a waveform reconstruction device according to the variation of Embodiment 2.

FIG. 14 illustrates experimental results obtained by the waveform reconstruction device according to the variation of Embodiment 2.

FIG. 15 illustrates experimental results obtained by a waveform reconstruction device according to a variation of Embodiment 3.

DESCRIPTION OF EMBODIMENTS

A waveform reconstruction system and a waveform reconstruction device according to an aspect of the present invention reconstruct a time waveform of an input optical signal, using a feature of a nonlinear optical effect that limits a time waveform which causes a combination of certain spectral changes. Specifically, a waveform reconstruction system and a waveform reconstruction device compare, using actually measured values and calculated values, plural spectral changes due to such a nonlinear optical effect that are obtained when the intensity of an input optical signal is changed, and reconstruct a time waveform of an input optical signal using the comparison results. A phase spectrum necessary for reconstructing a time waveform is determined by changing a phase spectrum such that a calculated power spectrum (calculated value) obtained by a simulation in accordance with an optimization algorithm such as simulated annealing approaches a measured power spectrum (actually measured value).

The following describes embodiments, with reference to the drawings. The embodiments described below each show a general or specific example. The numerical values, shapes, materials, constituent elements, the arrangement and connection of the constituent elements, steps, the processing order of the steps, and the like shown in the following embodiments are mere examples, and thus are not intended to limit the scope of the claims. Therefore, among the constituent elements in the following exemplary embodiments, constituent elements not recited in any of the independent claims defining the most generic part of the inventive concept are described as arbitrary constituent elements.

Embodiment 1

Configuration of Waveform Reconstruction System

Figure 1:
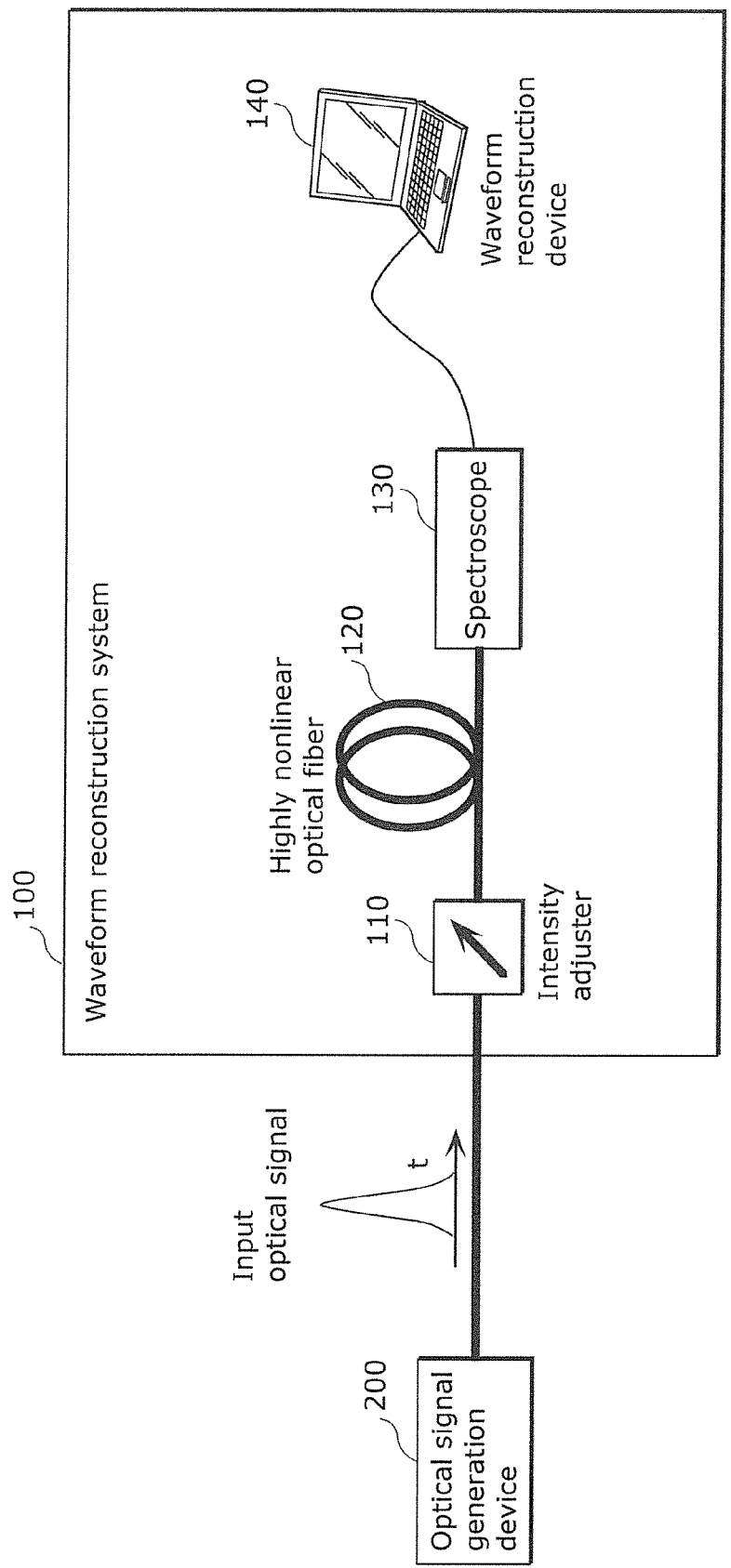
FIG. 1 illustrates an overall configuration of a waveform reconstruction system according to Embodiment 1.

FIG. 1 illustrates an overall configuration of a waveform reconstruction system 100 according to Embodiment 1. The waveform reconstruction system 100 reconstructs a time waveform of an input optical signal. As illustrated in FIG. 1, the waveform reconstruction system 100 includes an intensity adjuster 110, a highly nonlinear optical fiber 120, a spectroscope 130, and a waveform reconstruction device 140.

The intensity adjuster 110 changes the intensity of an input optical signal generated by an optical signal generation device 200.

The highly nonlinear optical fiber 120 is an example of an optical transmission medium having a nonlinear optical effect. An input optical signal whose intensity has been changed by the intensity adjuster 110 propagates through the highly nonlinear optical fiber 120.

The highly nonlinear optical fiber 120 is a fiber whose parameter for a nonlinear optical effect is known. In the present embodiment, the highly nonlinear optical fiber 120 is a fiber whose parameter for a dispersion effect is also known. Specifically, for example, a fourth-order dispersion parameter is known in addition to a second-order dispersion parameter and a third-order dispersion parameter.

The spectroscope 130 is an example of a spectrum measuring device, resolves an output optical signal into light beams of wavelengths, and performs optic-to-electric conversion and analog-to-digital conversion on the light beams resolved on a per-wavelength basis, thus generating a power spectrum expressed by digital values. Thus, the spectroscope 130 measures a power spectrum of an output optical signal. Here, an output optical signal is an optical signal that is an input optical signal output after having propagated through the highly nonlinear optical fiber 120.

Figure 16:
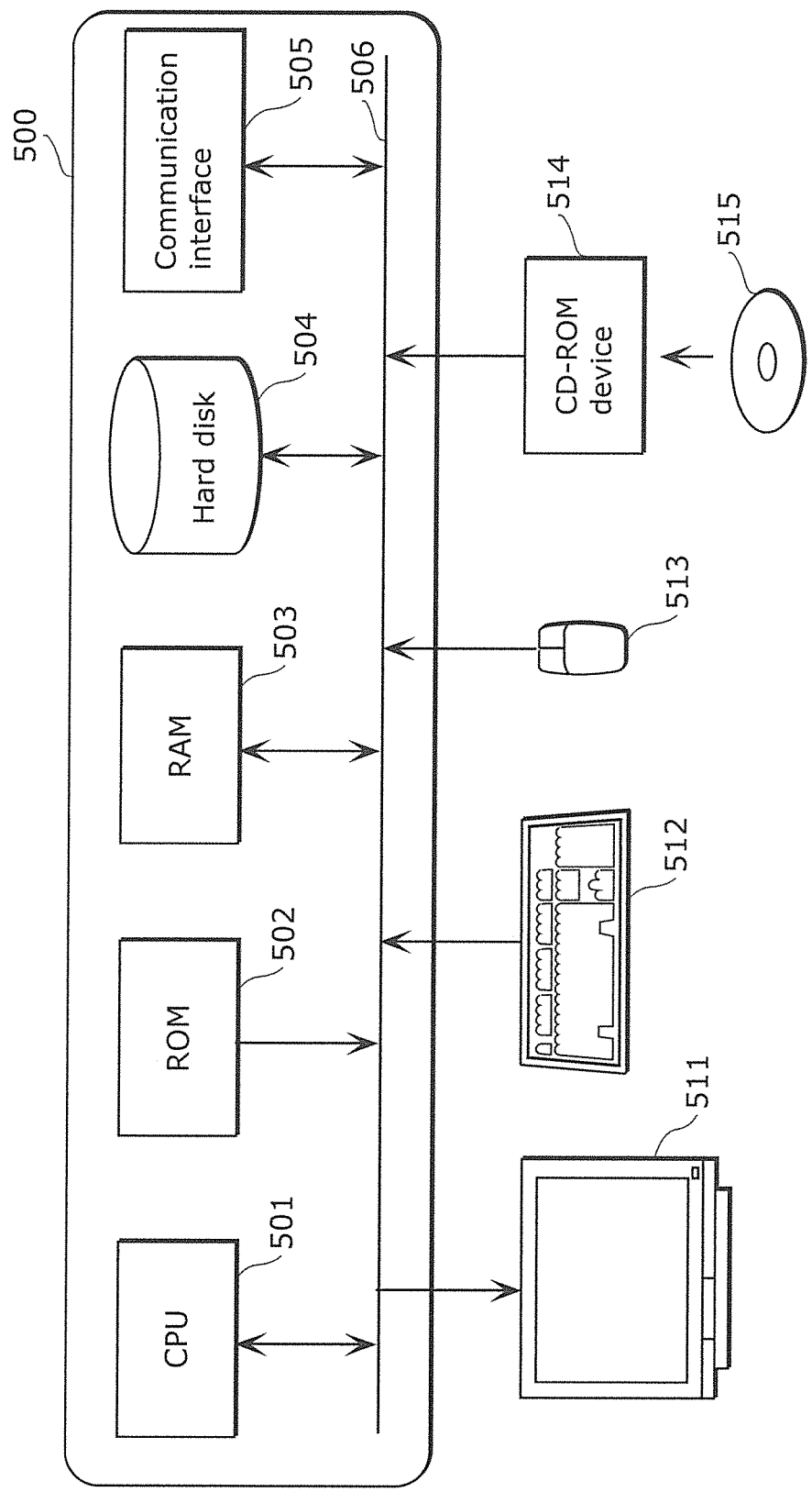
FIG. 16 illustrates an example of a hardware configuration of a computer.

The waveform reconstruction device 140 is achieved by, for example, a computer as illustrated in FIG. 16, and reconstructs a time waveform of an input optical signal. The details of the waveform reconstruction device 140 are described below using FIG. 2.

The optical signal generation device 200 generates an input optical signal. Specifically, for example, the optical signal generation device 200 includes a mode-locked laser diode (MLLD), a single mode fiber (SMF), and an erbium doped fiber amplifier (EDFA). The optical signal generation device 200 performs, using the SMF, dispersion compensation on an optical pulse output from the MLLD, and amplifies the result using the EDFA.

<Configuration of Waveform Reconstruction Device>

Figure 2:
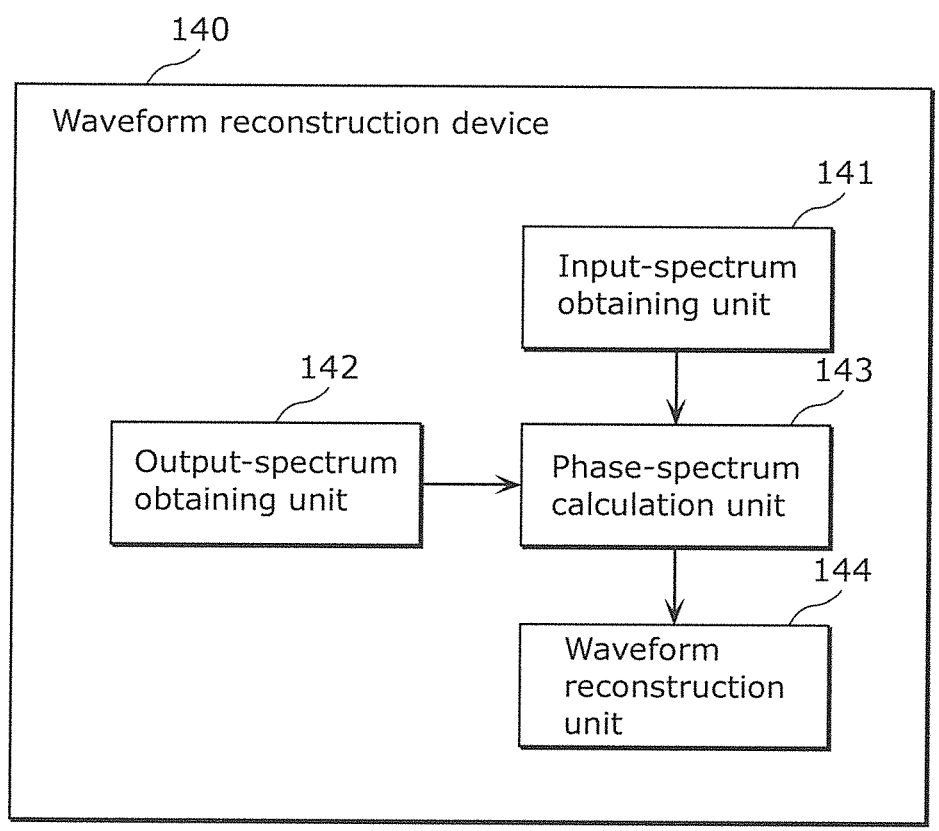
FIG. 2 is a block diagram illustrating a distinctive functional configuration of a waveform reconstruction device according to Embodiment 1.

FIG. 2 is a block diagram illustrating a distinctive functional configuration of the waveform reconstruction device 140 according to Embodiment 1. As illustrated in FIG. 2, the waveform reconstruction device 140 includes an input-spectrum obtaining unit 141, an output-spectrum obtaining unit 142, a phase-spectrum calculation unit 143, and a waveform reconstruction unit 144.

The input-spectrum obtaining unit 141 obtains information indicating a power spectrum of an input optical signal generated by the optical signal generation device 200. For example, if the power spectrum of the input optical signal generated by the optical signal generation device 200 is known, the input-spectrum obtaining unit 141 obtains information indicating the power spectrum of the input optical signal by reading data of the power spectrum stored in a storage unit, for instance. On the other hand, if the power spectrum of the input optical signal generated by the optical signal generation device 200 is unknown, the input-spectrum obtaining unit 141 obtains the power spectrum of the input optical signal measured using, for instance, a spectroscope not illustrated. A power spectrum is data indicating the luminous intensity per wavelength of an optical signal.

It should be noted that information indicating a power spectrum of an input optical signal does not necessarily need to indicate the power spectrum of the input optical signal itself. For example, information indicating a power spectrum of an input optical signal may indicate an autocorrelation function of the input optical signal, instead of the power spectrum of the input optical signal. Specifically, information indicating a power spectrum of an input optical signal may be any information as long as the power spectrum of an input optical signal can be obtained from the information.

The output-spectrum obtaining unit 142 obtains, for each of intensities of an input optical signal, a measured power spectrum which is a power spectrum of an output optical signal that is an input optical signal output after having propagated through the highly nonlinear optical fiber 120 and measured by the spectroscope 130. Here, a measured power spectrum indicates a luminous intensity per wavelength of an output optical signal.

The phase-spectrum calculation unit 143 calculates, for each of the intensities of an input optical signal where the input optical signal is assumed to have a given phase spectrum, a power spectrum of an output optical signal by simulating propagation of an input optical signal through the highly nonlinear optical fiber 120. Then, the phase-spectrum calculation unit 143 simulates propagation while changing the given phase spectrum to decrease a difference per intensity between a calculated power spectrum and a measured power spectrum, to search for a phase spectrum of an input optical signal. For example, the phase-spectrum calculation unit 143 changes a given phase spectrum in accordance with a predetermined algorithm.

Here, a predetermined algorithm is an algorithm for searching for an optimal solution or an approximate solution of a given function. Examples of a predetermined algorithm include simulated annealing, a conjugate direction method, a conjugate gradient method, a genetic algorithm, and others. It should be noted that the predetermined algorithm does not need to be limited to those algorithms, and may be any algorithm.

It should be noted that a phase spectrum for which the phase-spectrum calculation unit 143 searches is data indicating a phase per wavelength of an optical signal.

Further, an example of propagation simulation executed by the phase-spectrum calculation unit 143 is a pulse propagation simulation by a split step Fourier method. Specifically, the propagation simulation executed by the phase-spectrum calculation unit 143 is optical signal propagation simulation for calculating a power spectrum of an output optical signal, using a known parameter specific to the highly nonlinear optical fiber 120. Parameters used here include a parameter for an optical nonlinear effect. In the present embodiment, parameters also include a parameter for a dispersion effect.

Further, a given phase spectrum is a phase spectrum given in propagation simulation, and is a virtual phase spectrum of an input optical signal. Specifically, a given phase spectrum is a phase spectrum used in propagation simulation. A given phase spectrum used in propagation simulation most highly evaluated is determined to be a phase spectrum of an input optical signal.

The waveform reconstruction unit 144 performs frequency-time transform on a phase spectrum found through the search by the phase-spectrum calculation unit 143, and a power spectrum indicated in the information obtained by the input-spectrum obtaining unit 141, to reconstruct a time waveform of an input optical signal. Specifically, for example, the waveform reconstruction unit 144 performs inverse Fourier transform on a phase spectrum and a power spectrum, to reconstruct a time waveform.

<Processing Operation by Waveform Reconstruction Device>

The following describes various operations by the waveform reconstruction device 140 having a configuration as described above.

Figure 3:
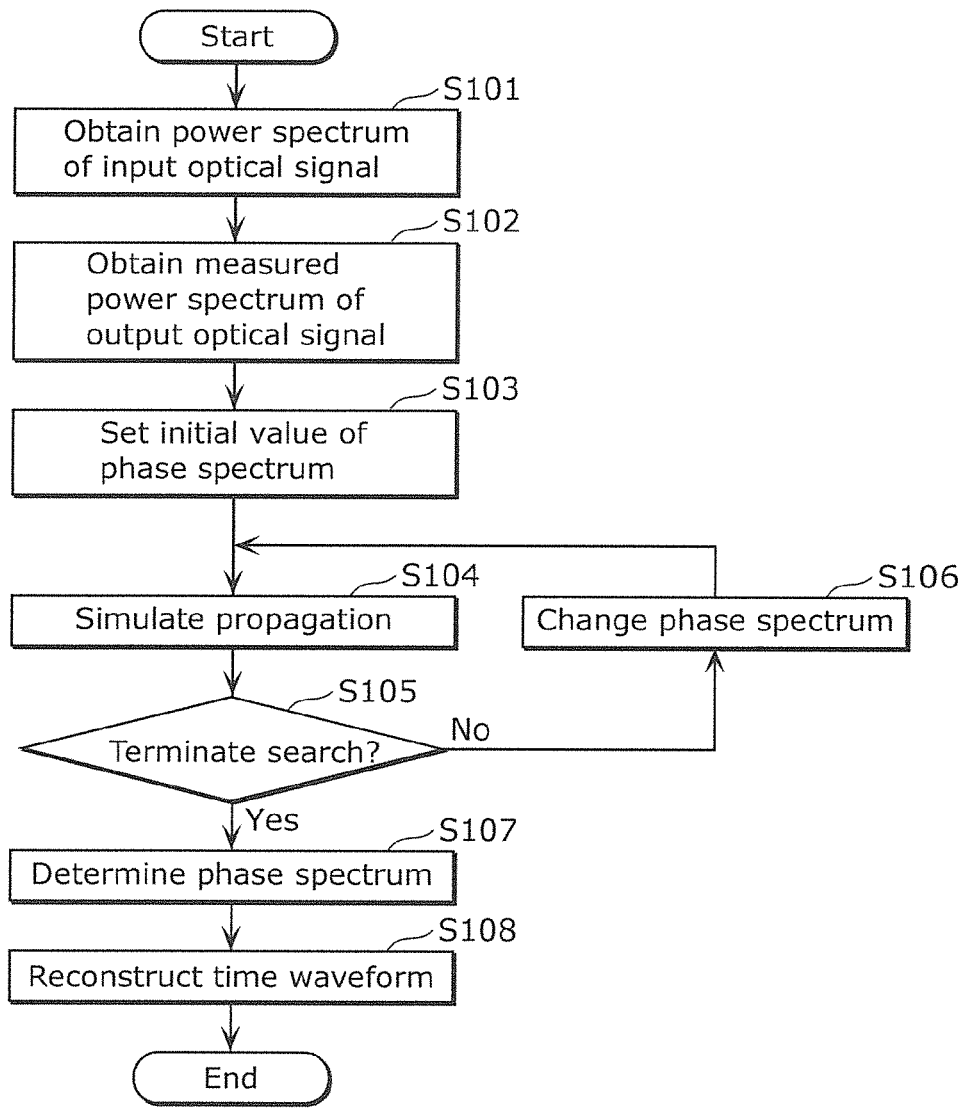
FIG. 3 is a flowchart showing processing operation of the waveform reconstruction device according to Embodiment 1.

FIG. 3 is a flowchart showing operation by the waveform reconstruction device 140 according to Embodiment 1.

First, the input-spectrum obtaining unit 141 obtains information indicating a power spectrum of an input optical signal generated by the optical signal generation device 200 (step S101). Next, the output-spectrum obtaining unit 142 obtains measured power spectra which are power spectra of output optical signals corresponding to the intensities of an input optical signal and measured by the spectroscope 130 (step S102).

Next, the phase-spectrum calculation unit 143 sets an initial value of a given phase spectrum used in propagation simulation (step S103). For example, the phase-spectrum calculation unit 143 sets a given phase spectrum as an initial value. Further, for example, the phase-spectrum calculation unit 143 may set, as an initial value, a phase spectrum obtained when the input optical signal is assumed to be a pulse of a predetermined type.

Then, the phase-spectrum calculation unit 143 simulates, for each of the intensities of an input optical signal where the input optical signal is assumed to have a given phase spectrum, propagation of the input optical signal through the highly nonlinear optical fiber 120, to calculate a power spectrum of an output optical signal (step S104). The details of propagation simulation are described below.

Next, the phase-spectrum calculation unit 143 determines whether to terminate a search for a phase spectrum (step S105). For example, the phase-spectrum calculation unit 143 determines whether to terminate a search, based on whether values indicating differences between the plural calculated power spectra and the plural measured power spectra which are measured by the spectroscope 130 (obtained in step S102) are each a predetermined threshold value or less. Further, for example, the phase-spectrum calculation unit 143 may determine whether to terminate a search, based on a change rate of values indicating differences between calculated power spectra and measured power spectra. Further, for example, the phase-spectrum calculation unit 143 determines whether to terminate a search, based on whether the number of iterations of propagation simulation has reached an upper limit.

Here, if a search is determined not to be terminated (No in step S105), the phase-spectrum calculation unit 143 changes the given phase spectrum to reduce a difference between a calculated power spectrum and a measured power spectrum (step S106). Specifically, the phase-spectrum calculation unit 143 sets a new given phase spectrum to be used for propagation simulation, in accordance with simulated annealing, for example. Then, processing is iterated from step S104 again.

On the other hand, if a search is determined to be terminated (Yes in step S105), the phase-spectrum calculation unit 143 determines a given phase spectrum used in propagation simulation that produces the smallest difference to be a phase spectrum of the input optical signal (step S107).

In this way, the phase-spectrum calculation unit 143 iterates propagation simulation to search for a phase spectrum of an input optical signal, while changing a given phase spectrum until a search is determined to be terminated. Specifically, the phase-spectrum calculation unit 143 searches for an optimal solution of a phase spectrum, using an evaluation function for evaluating a difference per intensity between a calculated power spectrum and a measured power spectrum.

An evaluation function is a function whose value changes according to the amount of difference between a measured power spectrum and a calculated power spectrum. For example, as an evaluation function, a function for evaluating how close differences of frequency component values between a measured power spectrum and a calculated power spectrum are to "0" may be used. In this case, for example, a sum of absolute differences or a sum of squared differences of frequency component values may be used as a value indicating a difference. Further, as an evaluation function, a function for evaluating how close a ratio of frequency component values of the calculated power spectrum to those of a measured power spectrum is to "1" may be used, for example.

Finally, a time waveform of the input optical signal is reconstructed by performing frequency-time transform on the power spectrum of the input optical signal and the determined phase spectrum (step S108), and processing ends.

The waveform reconstruction device 140 can reconstruct a time waveform of an input optical signal in a simplified manner by the above processing, using a power spectrum of an output optical signal that is an input optical signal output after having propagated through an optical transmission medium having a nonlinear optical effect.

<Propagation Simulation>

The following describes in detail propagation simulation by the split step Fourier method. First is a description of a dispersion effect and a nonlinear optical effect which exert an influence on an optical signal which propagates through the highly nonlinear optical fiber 120.

A dispersion effect is a phenomenon caused by a difference in interaction between light and a substance depending on a wavelength of the light. The dispersion effect changes the velocity of propagation of an input optical signal according to a frequency. Specifically, the phases of frequency components included in an input optical signal shift, and a time waveform of an input optical signal extends.

Further, nonlinear optical effects are various nonlinear phenomena caused by interaction between a substance and light (for example, light having extremely strong intensity such as an ultrashort optical pulse). Nonlinear optical effects include self-phase modulation, self-steepening, a Raman response, and others.

First is a description of self-phase modulation. A refractive index of an optical transmission medium such as an optical fiber slightly changes in proportion to the intensity of an optical signal which propagates therethrough, and thus phase modulation of the optical signal itself occurs. Phase modulation that occurs in this manner is called self-phase modulation.

The following describes self-steepening. Self-steepening is a phenomenon in which a symmetrical time waveform of an input optical signal becomes asymmetrical as the signal propagates through an optical transmission medium, which shifts a peak backwards. Self-steepening is caused due to the dependence of a group velocity on intensity.

Finally, a description is given of a Raman response. When light is incident on a substance, the light is scattered into elastically scattered strong light (Rayleigh scattered light) having the same frequency as incident light, and inelastically scattered very weak light having a slightly different frequency from that of incident light. Inelastically scattered light is divided into Raman scattered light which is scattered by vibrating atoms and ions in a substance, and Brillouin scattered light which is scattered by a sound wave in a substance. Stimulated Raman scattering refers to a phenomenon in which Raman scattered light is strongly generated by induced emission if the intensity of incident light exceeds a certain threshold in Raman scattering. A Raman response refers to a phenomenon in which the induced Raman scattering causes transfer of energy from high frequency components of light to low frequency components in an optical transmission medium, which intensifies low-frequency components.

Expression (1) indicates a propagation formula of an input optical signal which propagates through the highly nonlinear optical fiber 120 while the influence of dispersion effects and nonlinear optical effects as described above is exerted thereon.

[Math. 1]

$$\frac{dE}{dz} = (D + N)E \quad (1)$$

Here, E denotes a light field component, and z denotes the length of the highly nonlinear optical fiber 120. Further, D denotes a dispersion effect and a loss, and N denotes a nonlinear optical effect. D and N are expressed by Expressions (2) and (3) below.

[Math. 2]

$$D = -\frac{i}{2}\beta_2 \frac{\partial^2}{\partial T^1} + \frac{1}{6}\beta_3 \frac{\partial^3}{\partial T^3} - \frac{i}{24}\beta_4 \frac{\partial^4}{\partial T^4} - \frac{\alpha}{2} \quad (2)$$

[Math. 3]

$$N = i\gamma\left(|E|^2 + \frac{2i}{\omega_0 E}\frac{\partial}{\partial T}(|E|^2 E) - T_R \frac{\partial |E|^2}{\partial T}\right) \quad (3)$$

Here, α, β, and γ denote parameters specific to the highly nonlinear optical fiber 120. Specifically, α denotes a parameter for the loss of luminous intensity. Further, β denotes a parameter for a dispersion effect of each degree. Further, γ denotes a parameter for a nonlinear optical effect. It should be noted that T denotes time.

On the right-hand side of Expression (2), the first term denotes second-order dispersion, the second term denotes third-order dispersion, the third term denotes fourth-order dispersion, and the last term denotes the loss of intensity of light which propagates through the highly nonlinear optical fiber 120. Further, on the right-hand side of Expression (3), the first term denotes self-phase modulation, the second term denotes self-steepening, and the third term denotes a Raman response.

Figure 4:
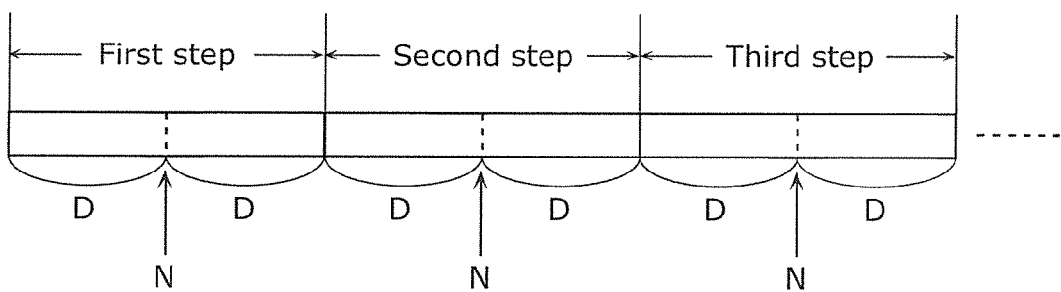
FIG. 4 is a diagram for describing the split step Fourier method in Embodiment 1.

A term depending on E itself is included in this propagation formula. Accordingly, it is difficult to calculate dispersion term (D) and nonlinear term (N) simultaneously. Thus, according to the split step Fourier method, as illustrated in FIG. 4, the highly nonlinear optical fiber 120 is virtually sectioned into short steps in a direction in which an optical signal propagates. Then, a dispersion term and a nonlinear term are sequentially calculated for each step, thus obtaining an approximate solution of an optical signal which propagates through the highly nonlinear optical fiber 120.

<Experimental Results>

The following describes experimental results obtained by the waveform reconstruction system 100 according to the present embodiment.

In this experiment, the optical signal generation device 200 performed, using a 65-meter single mode fiber (SMF), dispersion compensation on a 1.3 ps optical pulse output from a mode-locked laser diode (MLLD) at 10 GHz cycle, and thereafter amplified the resultant pulse using an erbium-doped optical fiber amplifier (EDFA). The optical signal generation device 200 output the optical pulse amplified by the EDFA in this manner as an input optical signal.

A variable optical attenuator (VOA) was used as the intensity adjuster 110. The intensity adjuster 110 changed the intensity of the input optical signal generated by the optical signal generation device 200 to ten different intensities, by increasing power by 10.3 mW from 17.2 mW. Then, the intensity adjuster 110 output the input optical signal having changed intensities to the highly nonlinear optical fiber 120.

As the highly nonlinear optical fiber 120, an optical fiber having parameters illustrated in Table 1 was used, with fourth-order dispersion taken into consideration, in addition to second-order dispersion and third-order dispersion.

TABLE 1

| | |
|---|---|
| Loss: α | 1.0 dB/km |
| 2nd order dispersion: $\beta_2$ | +2.36 × $10^{-2}$ $ps^2$/km |
| 3rd order dispersion: $\beta_3$ | +4.72 × $10^{-3}$ $ps^3$/km |
| 4th order dispersion: $\beta_4$ | +2.90 × $10^{-4}$ $ps^4$/km |
| Nonlinearily: γ | 15.0/W/km |
| Fiber length: L | 92 m |

Figure 5:
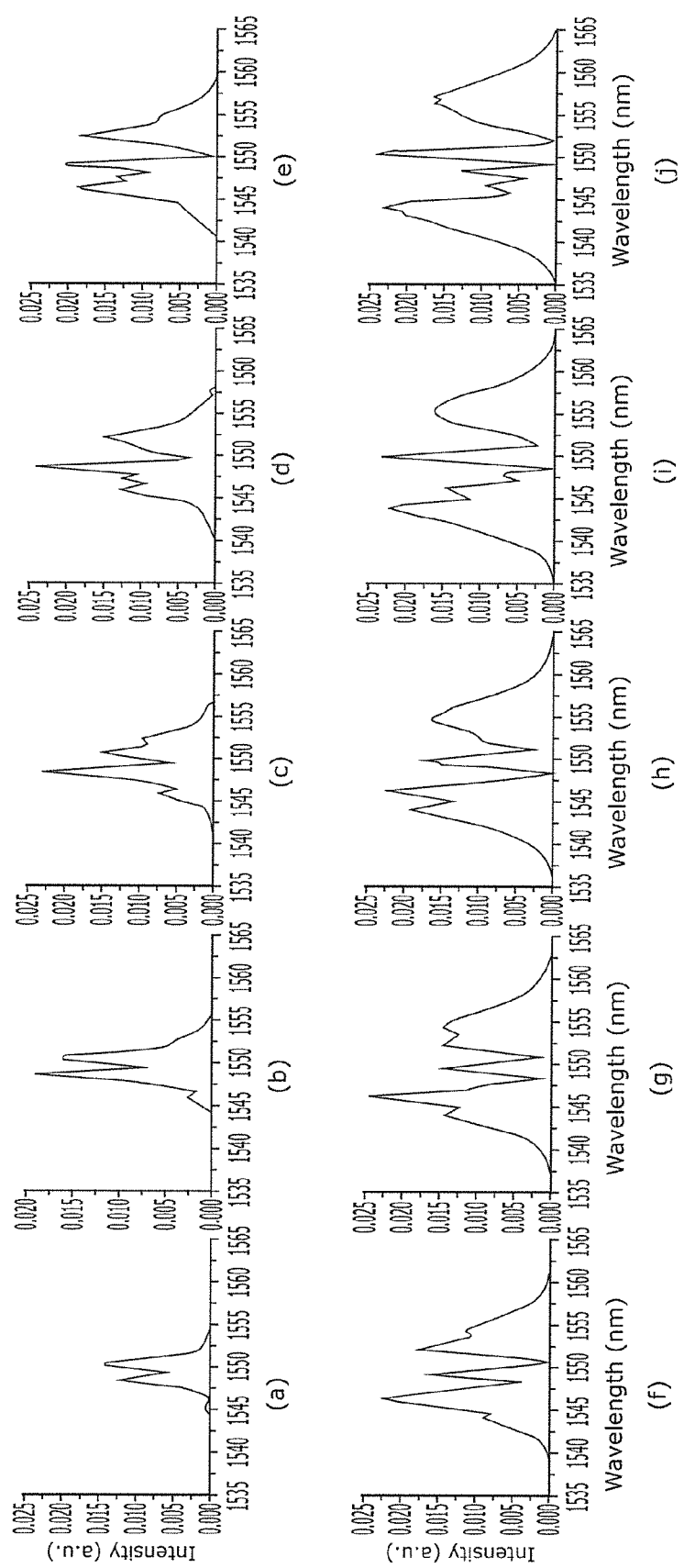
FIG. 5 illustrates graphs showing experimental results of power spectra of output optical signals measured by a spectroscope in Embodiment 1.

Parts (a) to (j) of FIG. 5 illustrate power spectra of output optical signals measured by the spectroscope 130, which correspond to the ten intensities of an input optical signal. The horizontal axis of the graphs indicates a wavelength (nm), and the vertical axis indicates intensity (a.u.). The power spectra illustrated in (a) to (j) of FIG. 5 are power spectra of output optical signals when the power of the intensity adjuster 110 is 17.2 mW, 27.5 mW, 37.8 mW, 48.1 mW, 58.4 mW, 68.7 mW, 79.0 mW, 89.4 mW, 99.7 mW, and 110.0 mW, respectively.

In this experiment, the phase-spectrum calculation unit 143 included in the waveform reconstruction device 140 searched for a phase spectrum with which the evaluation function has the smallest value, while changing a phase spectra in accordance with simulated annealing using, as an evaluation function, a sum of absolute differences between actually measured values of the power spectra of output optical signals corresponding to seven intensities (illustrated in (a) to (g) of FIG. 5) and calculated values of power spectra of the output optical signals obtained by simulations. At that time, as the initial value of a phase spectrum, based on a pulse width obtained by auto correlation, a phase spectrum of a signal that is approximated to a Sech optical pulse by the Gerchberg-Saxton method was used. Using such a phase spectrum as an initial value allows early convergence of values of an evaluation function.

Figure 6:
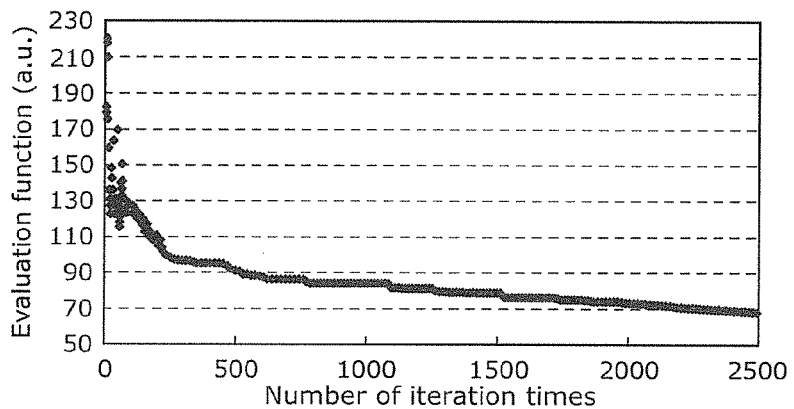
FIG. 6 is a graph showing an experimental result of changes in value of an evaluation function during a search for a phase spectrum in Embodiment 1.

FIG. 6 is a graph showing an experimental result of a change in value of an evaluation function during a search for a phase spectrum. In FIG. 6, the horizontal axis of the graph indicates the number of iterations (Number of iteration times) of an evaluation function, whereas the vertical axis indicates a value of an evaluation function (Evaluation function (a.u.)).

As is clear from FIG. 6, values of an evaluation function are converged comparatively early on a constant value. The phase-spectrum calculation unit 143 determined a phase spectrum which was obtained when values of the evaluation function were converged on a constant value (for example, in the 2500th iteration in FIG. 6), to be a phase spectrum of an input optical signal.

Figure 7:
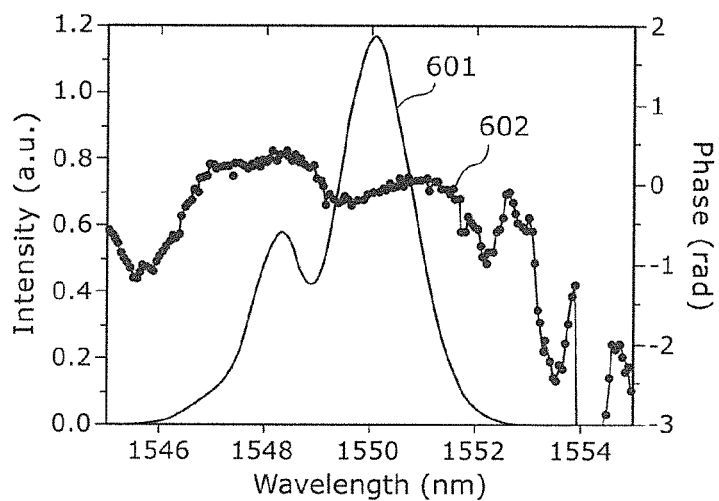
FIG. 7 illustrates a power spectrum and a phase spectrum obtained in an experiment in Embodiment 1.

FIG. 7 illustrates a power spectrum and a phase spectrum obtained by the experiment. In FIG. 7, the horizontal axis indicates a wavelength (nm). Further, the vertical axis on the left indicates intensity (a.u.), whereas the vertical axis on the right indicates phase (rad). Here, a power spectrum 601 corresponds to the intensity indicated by the vertical axis on the left, whereas a phase spectrum 602 corresponds to the phase indicated by the vertical axis on the right.

The waveform reconstruction unit 144 included in the waveform reconstruction device 140 reconstructs a time waveform of an input optical signal, using the phase spectrum 602 and the power spectrum 601 of the input optical signal calculated as shown in FIG. 7.

Figure 8:
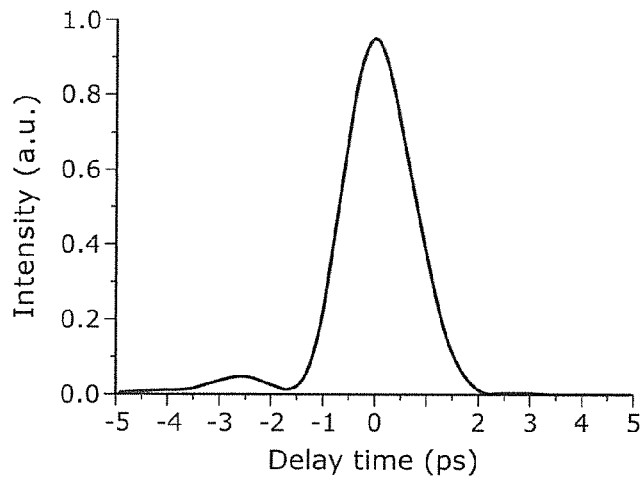
FIG. 8 illustrates an experimental result of a time waveform of an input optical signal reconstructed by the waveform reconstruction device, in Embodiment 1.

FIG. 8 illustrates an experimental result of a time waveform of an input optical signal reconstructed by the waveform reconstruction device 140. In FIG. 8, the horizontal axis indicates time (Delay time (ps)), and the vertical axis indicates intensity (a.u.).

As is clear from FIG. 8, a time waveform of the reconstructed input optical signal differs from a Sech or Gaussian time waveform approximated as general pulsed light. Specifically, it can be considered that the waveform reconstruction device 140 successfully reconstructed a more accurate time waveform than a time waveform obtained by general approximation.

Next, a simulation executed by the phase-spectrum calculation unit 143 in the above experiment and a calculated phase spectrum are validated.

Figure 9:
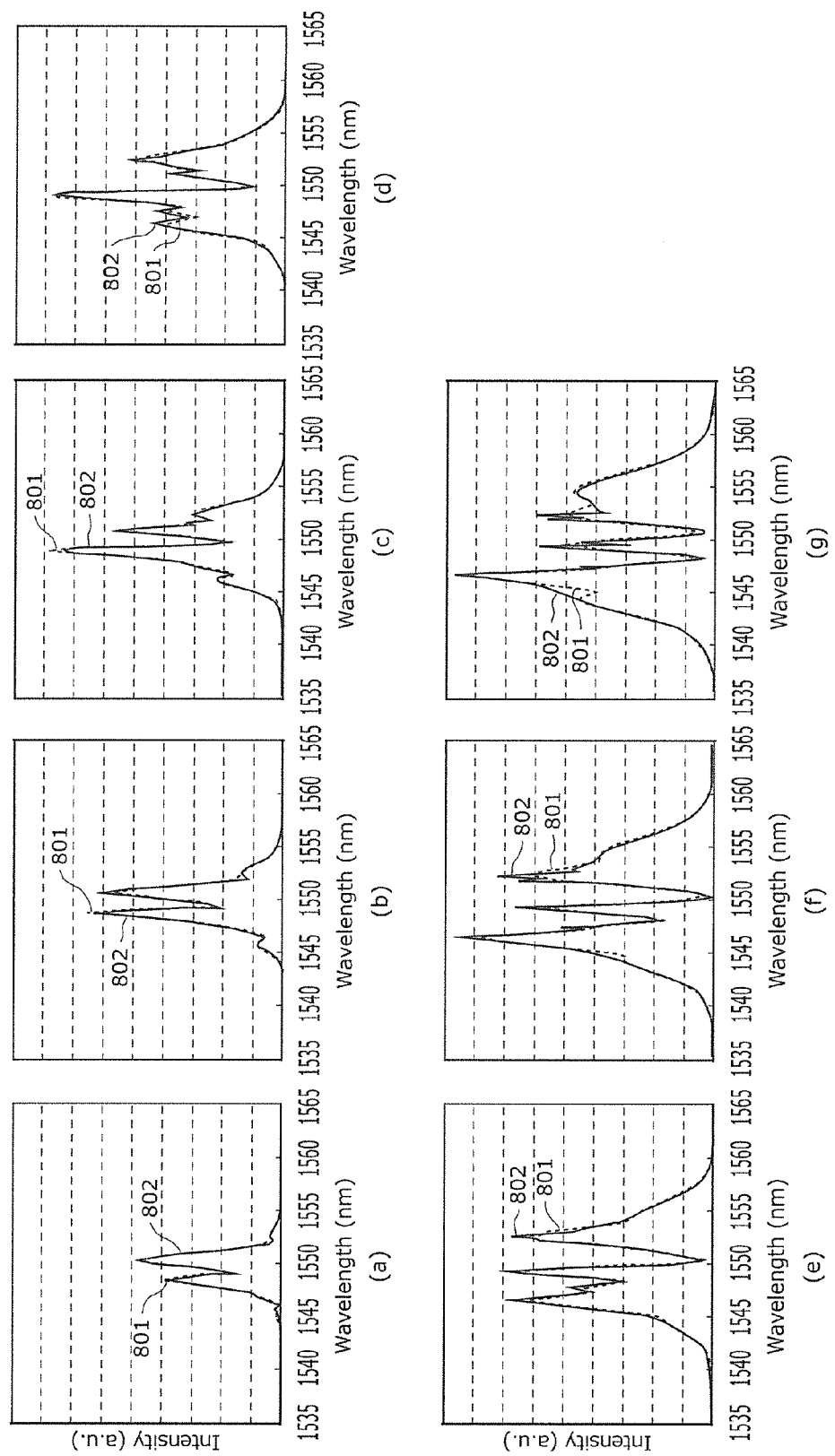
FIG. 9 illustrates graphs showing results of comparisons between actually measured values and calculated values of power spectra of output optical signals corresponding to seven intensities of an input optical signal in Embodiment 1.

FIG. 9 illustrates graphs showing the results of comparisons between actually measured values and calculated values of power spectra of output optical signals corresponding to seven intensities of an input optical signal. It should be noted that a calculated value of a power spectrum is a value of a power spectrum obtained when values of an evaluation function are converged by iterated calculations. Further, seven intensities of an input optical signal are obtained when the power of the intensity adjuster 110 is 17.2 mW, 27.5 mW, 37.8 mW, 48.1 mW, 58.4 mW, 68.7 mW, and 79.0 mW.

Actually measured values 801 and calculated values 802 are substantially the same, as illustrated in (a) to (g) of FIG. 9. Consequently, this experiment shows that a change in power spectra due to self-phase modulation, which sensitively reacts to a time waveform of an input optical signal, can be accurately simulated.

Figure 10:
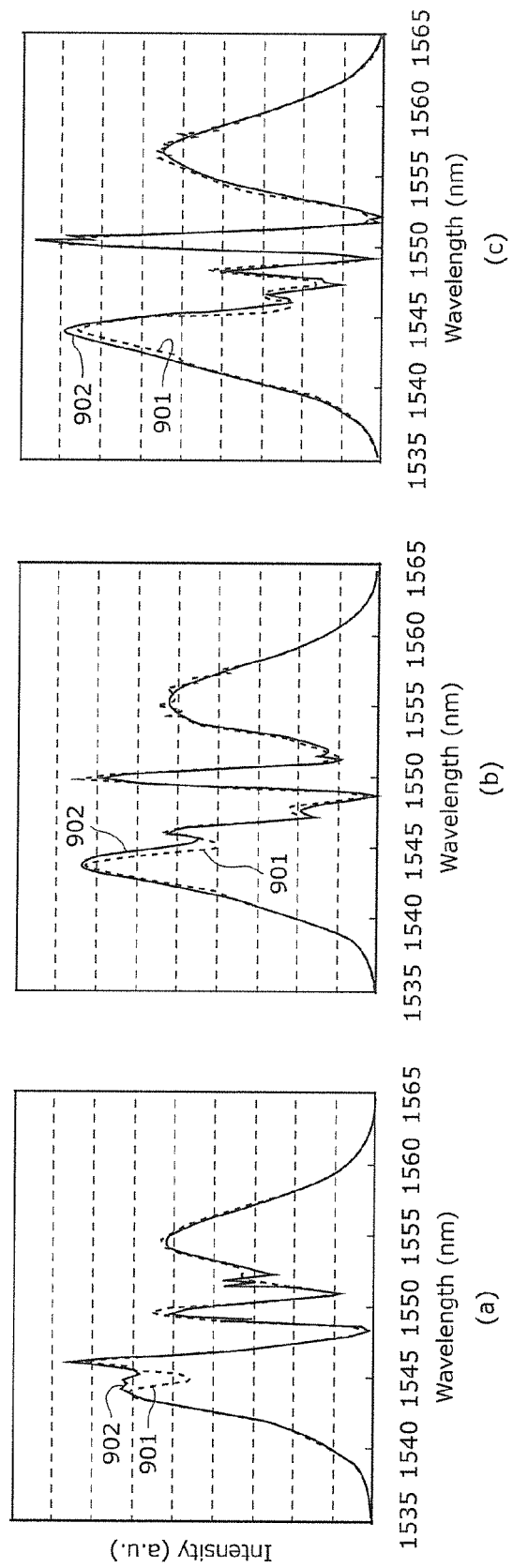
FIG. 10 illustrates graphs showing results of comparisons between actually measured values and calculated values of power spectra of output optical signals corresponding to three intensities of an input optical signal not used for calculation of a phase spectrum among power spectra of output optical signals corresponding to ten intensities of an input optical signal measured by the spectroscope, in Embodiment 1.

FIG. 10 illustrates graphs showing results of comparisons between actually measured values and calculated values of power spectra of output optical signals corresponding to three intensities of an input optical signal not used for calculating a phase spectrum, among the power spectra of output optical signals corresponding to the ten intensities of an input optical signal measured by the spectroscope 130. It should be noted that the calculated values of the power spectra are obtained through simulations using phase spectra of an input optical signal calculated by the phase-spectrum calculation unit 143. The three intensities of the input optical signal not used for calculating a phase spectrum are obtained when the power of the intensity adjuster 110 is 89.4 mW, 99.7 mW, and 110.0 mW.

Actually measured values 901 and calculated values 902 are substantially the same, as illustrated in (a) to (c) of FIG. 10. Specifically, regarding the intensities of the input optical signal not used for an evaluation function in simulated annealing, the power spectra of the output optical signals are also accurately calculated using phase spectra calculated by the phase-spectrum calculation unit 143. Thus, this shows that the accuracy of phase spectra of an input optical signal calculated by the phase-spectrum calculation unit 143 is high. In other words, the accuracy of a time waveform of an input optical signal reconstructed using a phase spectrum of an input optical signal calculated by the phase-spectrum calculation unit 143 is high.

As described above, the waveform reconstruction system 100 and the waveform reconstruction device 140 according to the present embodiment can reconstruct a time waveform of an input optical signal, using a power spectrum of an output optical signal that is an input optical signal output after having propagated through an optical fiber which induces self-phase modulation. Consequently, the waveform reconstruction system 100 and the waveform reconstruction device 140 do not necessarily require time-resolved spectroscopic data. In other words, the waveform reconstruction system 100 does not necessarily include an ultra high-speed time gate or a reference light source necessary for obtaining time-resolved spectroscopic data in order to reconstruct a time waveform of an optical signal, thus allowing a time waveform of an optical signal to be reconstructed in a simplified manner.

Furthermore, the waveform reconstruction system 100 and the waveform reconstruction device 140 can search for a phase spectrum with which the value of an evaluation function is a predetermined threshold value or less, by iterating propagation simulation while changing a phase spectrum in accordance with simulated annealing which is a known technique, and thus can calculate a highly accurate phase spectrum for a comparatively short time.

Embodiment 2

The following describes Embodiment 2.

The present embodiment differs from Embodiment 1 in that a given phase spectrum is changed based on only a dispersion effect out of a nonlinear optical effect and a dispersion effect. Specifically, a waveform reconstruction device changes a given phase spectrum in accordance with a constraint in order to reduce a search time in the search for a phase spectrum. The following is a description given of a waveform reconstruction device according to the present embodiment, focusing on differences from Embodiment 1.

It should be noted that the configuration of a waveform reconstruction system according to the present embodiment and a functional configuration and processing operation of a waveform reconstruction device are the same as/similar to those as shown in FIGS. 1 to 3 of Embodiment 1, and thus are not illustrated.

In the present embodiment, the phase-spectrum calculation unit 143 changes a given phase spectrum, based on only a dispersion effect out of a nonlinear optical effect and a dispersion effect. Specifically, the phase-spectrum calculation unit 143 changes a given phase spectrum in accordance with a constraint. The constraint is a constraint on a phase spectrum to be satisfied when an input optical signal is assumed to be a resultant signal that has propagated through a medium having only a dispersion effect, out of a nonlinear optical effect and a dispersion effect.

Here, a detailed description is given of the constraint.

The waveform of an ultrashort light pulse immediately after being oscillated from a laser is assumed to be that of a transform-limited pulse (TLP) without distortion, and an input optical signal to be reconstructed is assumed to be an optical signal that is a TLP output after having propagated through a medium. In this case, a TLP propagates through a medium in accordance with Expression (1).

However, if a medium through which a TLP propagates is a general medium (or in other words, a medium which does not have particularly highly nonlinear optical features), the influence which a nonlinear optical effect has on the propagation of a TLP is not significant. Specifically, even if propagation is calculated by using Expression (1) excluding N, the result of the calculation does not significantly change. Thus, an input optical signal can be expressed as an optical signal that is a TLP output after having propagated through a medium having only a dispersion effect. Here, the effect of dispersion in a medium is expressed by Expression (4) by Taylor expansion.

[Math. 4]

$$\beta(\omega) = \beta_0 + \beta_1(\omega - \omega_0) + \frac{\beta_2}{2!}(\omega - \omega_0)^2 + \frac{\beta_3}{3!}(\omega - \omega_0)^3 + \frac{\beta_4}{4!}(\omega - \omega_0)^4 \ldots \quad (4)$$

In Expression (4), the zeroth-order term and the first order term merely influence a time shift of a time waveform, and do not influence a phase. Further, in simulation of propagation of an optical signal through a medium such as an optical fiber, it is generally sufficient if fourth-order dispersion is taken into consideration. In view of this, the phase of an input optical signal distorted due to the dispersion effect can be expressed as a polynomial function as shown by Expression (5).

[Math. 5]

$$\phi(\omega) = a(\omega-\omega_0)^2 + b(\omega-\omega_0)^3 + c(\omega-\omega_0)^4 \quad (5)$$

The phase-spectrum calculation unit 143 sets a given phase spectrum such that Expression (5) above is satisfied. Specifically, the phase-spectrum calculation unit 143 changes the given phase spectrum in accordance with the constraint indicated by Expression 5).

According to Expression (5), a phase spectrum is expressed by three variables, namely, a, b, and c. On the other hand, in Embodiment 1, a phase spectrum is expressed by variables (for example, 512 variables) for frequency components. Specifically, according to this variation, in the search for a phase spectrum, the number of variables can be decreased compared to Embodiment 1, thus reducing search space. Consequently, according to this variation, a time for searching for a phase spectrum can be reduced.

As described above, the waveform reconstruction device 140 according to the present embodiment can change a given phase spectrum in accordance with an appropriate constraint. Thus, the number of variables can be decreased in a search for a phase spectrum, thus achieving a reduction in a search time.

It should be noted that here, although second-order dispersion to fourth-dispersion are taken into consideration as a constraint, still higher-order dispersion may be taken into consideration. For example, when a phase spectrum is searched for, the order of dispersion taken into consideration as a constraint may be increased gradually. Thus, search space can be expanded gradually, and a reduction in a search time and improvement in search accuracy can be achieved.

Variation of Embodiment 2

The following describes a variation of Embodiment 2.

In Embodiment 2, an input optical signal is assumed to be a signal output after having propagated through a medium having only a dispersion effect. Thus, if influence other than a dispersion effect is exerted on an input optical signal, search accuracy falls. In view of this, a combination of the methods according to both of Embodiments 1 and 2 is used to search for a phase spectrum in this variation, in order to improve the accuracy of searching for a phase spectrum.

Specifically, when searching for a phase spectrum of an input optical signal, the phase-spectrum calculation unit 143 changes a given phase spectrum in accordance with a constraint and simulates propagation, and subsequently changes the given phase spectrum independently of the constraint and simulates propagation. Here, the constraint is the same as the constraint in Embodiment 2.

Specifically, the phase-spectrum calculation unit 143 first changes the given phase spectrum in accordance with the constraint, and searches for a phase spectrum. Subsequently, the phase-spectrum calculation unit 143 changes a phase spectrum independently of the constraint as described in Embodiment 1 by using the result of the search as an initial value of the given phase spectrum, and searches for a phase spectrum.

As described above, according to the waveform reconstruction device 140 according to this variation, after changing a given phase spectrum in accordance with a constraint, the given phase spectrum can be changed independently of the constraint. Thus, a search time can be reduced while avoiding a fall in search accuracy in the search for a phase spectrum.

<Experimental Results>

The following describes the results of experiment obtained by the waveform reconstruction device 140 according to this variation.

In this experiment, a fiber laser which generates an ultrashort light pulse having the central wavelength of 1546 nm and a repetition frequency of 25 MHz was used as the optical signal generation device 200. Further, as the highly nonlinear optical fiber 120, a 10-meter optical fiber was used which has greater nonlinear optical effect than Embodiment 1 ($\gamma=21$/W/km). Then, an optical signal was used which was obtained by weakening the intensity of the generated ultrashort light pulse such that a nonlinear optical effect is not produced, as an input optical signal.

Figure 11:
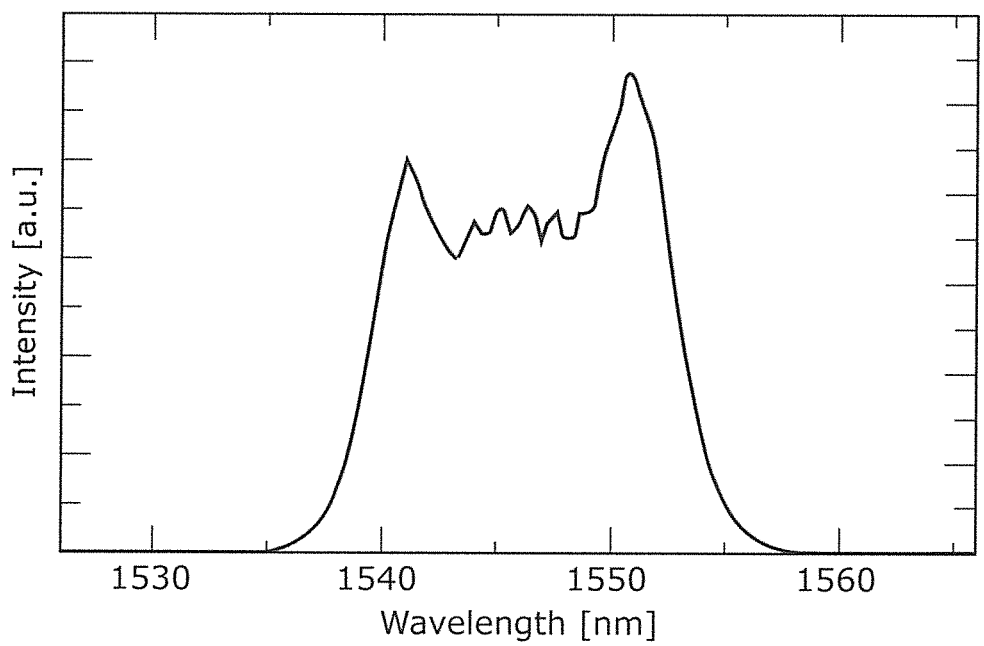
FIG. 11 is a graph showing a power spectrum of an input optical signal used in an experiment of a variation of Embodiment 2.

FIG. 11 is a graph showing a power spectrum of an input optical signal used in the experiment in the variation of Embodiment 2. Parts (a) and (b) of FIG. 12 are graphs showing power spectra measured by the spectroscope 130 after an input optical signal having two intensities has propagated through the highly nonlinear optical fiber 120. As illustrated in FIG. 12, the intensities of the input optical signal were changed by two states in this experiment.

As an evaluation function, a sum of absolute differences per frequency between measured power spectra which are measured by the spectroscope 130 and calculated power spectra obtained through propagation simulation using a given phase spectrum was normalized and used. The phase-spectrum calculation unit 143 iterates propagation simulation while changing a given phase spectrum so that the value of this evaluation function is decreased, to search for a phase spectrum. At this time, a phase spectrum was used in which component values are 0 at all frequencies, as an initial value of the given phase spectrum. The number of iterations of propagation simulation for search was set to 1000.

The results of experiments conducted on such conditions are described using FIGS. 13 and 14.

FIGS. 13 and 14 illustrate the results of experiments by a waveform reconstruction device according to a variation of Embodiment 2.

In FIG. 13, a horizontal axis indicates a wavelength, whereas a vertical axis on the left side indicates intensity and a vertical axis on the right side indicates phase. Further, a dashed line expresses a power spectrum and corresponds to the vertical axis for intensity. A solid line expresses a phase spectrum and corresponds to a vertical axis for phase. In FIG. 14, the horizontal axis indicates the number of iterations, and the vertical axis indicates evaluation function.

Further, in FIGS. 13 and 14, (a) illustrates experimental results obtained using the search method according to Embodiment 1, and (b) illustrates experimental results obtained using the search method according to this variation.

It should be noted that with the search method according to Embodiment 1, frequency component values of a given phase spectrum were independently set in all the 1000 propagation simulations. Further, with the search method according to this variation, the frequency component values of the given phase spectrum were set so as to satisfy Expression (5) in the first 52 propagation simulations among the 1000 propagation simulations. Then, in the last 948 propagation simulations, the frequency component values of the given phase spectrum were independently set irrespective of Expression (5).

As is clear from FIGS. 13 and 14, the search method according to this variation allows a solution to be more easily converged than the search method according to Embodiment 1, which results in an increase in the speed in the search. This can be seen that the constraint can appropriately reduce search space.

It should be noted that in this experiment, the values of an evaluation function obtained through 1000 propagation simulations by the search method according to Embodiment 1 are the same as the values of an evaluation function obtained by 293 propagation simulations by the method according to this variation. Specifically, the search method according to this variation achieved about 3.4 times increase in speed compared to the search method according to Embodiment 1, and thus successfully reduced a search time.

Further, as in this experiment, if the initial value of a given phase spectrum greatly differs from the optimal solution, the search method according to this variation results in higher search accuracy than the search method according to Embodiment 1. This can be considered that a constraint can appropriately reduce search space, and thus convergence to a local optimal solution can be avoided.

As described above, this experiment has successfully shown that changing a given phase spectrum in accordance with a constraint can improve search accuracy, and also reduce a search time.

Embodiment 3

The following describes Embodiment 3.

The present embodiment differs from Embodiment 1 mainly in that propagation is simulated based only on a nonlinear optical effect out of a nonlinear optical effect and a dispersion effect. The following describes a waveform reconstruction device according to the present embodiment, focusing on differences from Embodiment 1.

It should be noted that the configuration of a waveform reconstruction system according to the present embodiment and a function configuration and processing operation of a waveform reconstruction device are the same as and similar to those of FIGS. 1 to 3 of Embodiment 1, and thus illustration thereof is omitted.

In the present embodiment, the phase-spectrum calculation unit 143 simulates propagation, based only on a nonlinear optical effect out of a nonlinear optical effect and a dispersion effect. Specifically, the phase-spectrum calculation unit 143 simulates propagation using only a parameter for a nonlinear optical effect out of a nonlinear optical effect and a dispersion effect. Specifically, the phase-spectrum calculation unit 143 simulates propagation using, for example, Expression (2) excluding terms indicating second-order dispersion, third-order dispersion, and fourth-order dispersion (the first to third terms). More specifically, the phase-spectrum calculation unit 143 simulates propagation based on Expressions (6) to (8) below.

[Math. 6]

$$\frac{dE}{dz} = (D + N)E \tag{6}$$

$$D = -\frac{\alpha}{2} \tag{7}$$

$$N = i\gamma\left(|E|^2 + \frac{2i}{\omega_0 E}\frac{\partial}{\partial T}(|E|^2 E) - T_R \frac{\partial |E|^2}{\partial T}\right) \tag{8}$$

It should be noted that in propagation of an optical signal through an optical transmission medium having a significant nonlinear optical effect, a nonlinear optical effect is dominant, and a dispersion effect is limited. Specifically, the influence of a dispersion effect on simulation of propagation of an input optical signal through the highly nonlinear optical fiber 120 is less significant. Thus, even if propagation of an input optical signal through the highly nonlinear optical fiber 120 is simulated using only a parameter for a nonlinear optical effect, a fall in the accuracy of simulation can be avoided.

Furthermore, the exclusion of the terms showing a dispersion effect in this way allows D and N to be calculated simultaneously in Expression (6). Specifically, the phase-spectrum calculation unit 143 can simulate propagation by one calculation, without using the split step Fourier method. Consequently, a great increase in calculation speed can be achieved in propagation simulation.

It should be noted that the highly nonlinear optical fiber 120 has a wavelength (hereinafter "zero-dispersion wavelength") which produces "0" dispersion effect. The more frequency components of an input optical signal concentrate on a zero-dispersion wavelength, the less influence a dispersion effect has on propagation of an optical signal. Thus, the smaller a difference between the central wavelength of an input optical signal and the zero-dispersion wavelength of the highly nonlinear optical fiber 120 is, the higher accuracy can be achieved to simulate propagation even in disregard of a dispersion effect.

Consequently, if the central wavelength of an input optical signal is known, it is preferable to use the highly nonlinear optical fiber 120 having a zero-dispersion wavelength with an approximate value to the central wavelength of the input optical signal. This avoids a fall in the accuracy of a simulation result when propagation is simulated using only a parameter for a nonlinear optical effect out of a nonlinear optical effect and a dispersion effect.

It should be noted that according to an experiment, if the central wavelengths of an input optical signal ranges from 1520 nm to 1580 nm when the zero-dispersion wavelength of the highly nonlinear optical fiber 120 is 1550 nm, a fall in the accuracy of simulation can be effectively avoided.

As described above, according to the waveform reconstruction device 140 according to the present embodiment, propagation can be simulated using only a parameter for a nonlinear optical effect out of a nonlinear optical effect and a dispersion effect. Consequently, this simplifies propagation simulation, thus increasing the calculation speed.

Variation of Embodiment 3

The following describes a variation of Embodiment 3.

In Embodiment 3 above, propagation is simulated, taking into consideration self-phase modulation, self-steepening, and Raman response. The terms showing self-steepening and a Raman response (the second and third terms on the right-hand side of Expression (8)) include differentiation of a time waveform. The differentiation of a time waveform corresponds to an inclination of a time waveform during a certain time period. Specifically, the narrower the pulse width is, the greater influence self-steepening and a Raman response have on propagation. Conversely, if the pulse width is wider, even if propagation is simulated excluding the terms representing self-steepening and a Raman response, the simulation result is expected not to significantly change.

In view of this, in this variation, the phase-spectrum calculation unit 143 simulates propagation using only a parameter for self-phase modulation among parameters regarding a nonlinear optical effect. Specifically, the phase-spectrum calculation unit 143 simulates propagation using Expression (3) excluding the terms expressing self-steepening and a Raman response (the second and third terms), for example. More specifically, the phase-spectrum calculation unit 143 simulates propagation based on Expressions (9) to (11) below.

[Math. 7]

$$\frac{dE}{dz} = (D + N)E \quad (9)$$

$$D = -\frac{\alpha}{2} \quad (10)$$

$$N = i\gamma|E|^2 \quad (11)$$

As described above, the waveform reconstruction device 140 according to this variation can make propagation simulation more simplified than Embodiment 3 above, and can further increase the calculation speed of propagation simulation. In particular, if the pulse width of an input optical signal is wide, a fall in simulation accuracy can be avoided, which is effective. It should be noted that the experiment showed that a fall in the accuracy of simulation was avoided effectively, if a pulse width is 500 fs or more.

<Experimental Results>

The following describes experimental results obtained by the waveform reconstruction device 140 according to this variation. Here, an experiment was conducted under similar conditions to the experiment in the variation of Embodiment 2. It should be noted that in this experiment, the zero-dispersion wavelength of the highly nonlinear optical fiber 120 was 1550 nm. It should be noted that the method according to the variation of Embodiment 2 was used for the search method. Specifically, a given phase spectrum was changed first in accordance with a constraint.

FIG. 15 illustrates experimental results obtained by a waveform reconstruction device according to a variation of Embodiment 3.

In FIG. 15, the horizontal axis indicates wavelength, whereas the vertical axis on the left indicates intensity and the vertical axis on the right indicates phase. Further, the dashed line indicates a power spectrum and corresponds to the vertical axis for intensity. The solid line expresses a phase spectrum and corresponds to the vertical axis for phase. Further, (a) of FIG. 15 illustrates experimental results of propagation simulation based on the split step Fourier method. Further, (b) of FIG. 15 illustrates experimental results of propagation simulation according to this variation.

In propagation simulation based on the split step Fourier method, calculation was performed based on Expressions (1) to (3). In contrast, in propagation simulation according to this variation, calculation was performed based on Expressions (9) to (11).

As illustrated in FIG. 15, phase spectra found by the search through iterations of propagation simulation were almost the same in propagation simulation conducted in two different ways. Specifically, although a dispersion effect, for instance, was disregarded when performing propagation simulation, search results did not show much difference.

Further, propagation simulation according to this variation successfully achieved a great reduction in a calculation time than propagation simulation based on the split step Fourier method. Specifically, a time for 1000 propagation simulations was 9970 ms in the propagation simulation based on the split step Fourier method, whereas the time was only 567 ms in the propagation simulation according to this variation.

Specifically, this experiment has successfully shown that by simulating propagation in which only self-phase modulation among nonlinear optical effects is taken into consideration, a calculation time can be reduced while avoiding a fall in accuracy.

Although the above describes a waveform reconstruction device and a waveform reconstruction system according to an aspect of the present invention, based on embodiments, the present invention is not limited to the embodiments. The scope of the present invention includes various modifications to the embodiments that may be conceived by those skilled in the art or embodiments achieved by combining constituent elements in different embodiments, as long as those modifications and embodiments do not depart from the essence of the present invention.

For example, Embodiment 2 or the variation thereof above and Embodiment 3 or the variation thereof above may be combined. Specifically, the waveform reconstruction device may iterate propagation simulation using only a parameter for a nonlinear optical effect out of a nonlinear optical effect and a dispersion effect, while changing a given phase spectrum in accordance with a constraint. This achieves a further reduction in the search time for a phase spectrum.

Further, although the waveform reconstruction system includes a highly nonlinear optical fiber in Embodiments 1 to 3 above, the system may include an optical transmission medium different from an optical fiber. Specifically, the waveform reconstruction system may include an optical transmission medium having a nonlinear optical effect.

Further, the present invention can also be achieved as a waveform reconstruction method for executing processing that is performed by distinctive constituent elements of such a waveform reconstruction device. Further, the present invention can be achieved as a program for causing a computer to execute the waveform reconstruction method as illustrated in FIG. 16. Such a program can be distributed via a recording medium such as CD-ROM and a transmission medium such as the Internet.

FIG. 16 illustrates an example of a hardware configuration of a computer. A program for causing a computer to execute a waveform reconstruction method is stored in, for example, a CD-ROM 515 which is a computer-readable medium, and is read via a CD-ROM device 514. Further, for example, a program for causing a computer to execute a waveform reconstruction method is transmitted via a wired or wireless network, or broadcast.

A computer 500 includes a central processing unit (CPU) 501, read only memory (ROM) 502, random access memory (RAM) 503, a hard disk 504, a communication interface 505, and others.

The CPU 501 executes a program read via the CD-ROM device 514, and a program received via the communication interface 505. Specifically, the CPU 501 expands the program read via the CD-ROM device 514 or the program received via the communication interface 505 in the RAM 503. Then, the CPU 501 executes coded commands in the program expanded in the RAM 503.

The ROM 502 is read-only memory which stores programs and data necessary for the computer 500 to operate. The RAM 503 is used as a work area when the CPU 501 executes a program. Specifically, the RAM 503 temporarily stores data such as parameters for program execution and others, for example. The hard disk 504 stores programs, data, and others.

The communication interface 505 communicates with other computers via a network. A bus 506 connects the CPU 501, the ROM 502, the RAM 503, the hard disk 504, the communication interface 505, a display 511, a keyboard 512, a mouse 513, and the CD-ROM device 514.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which achieves the waveform reconstruction device according to the above embodiments and the like is a program as will be described below.

Accordingly, this program causes a computer to execute: a waveform reconstruction method for reconstructing a time waveform of an input optical signal, the waveform reconstruction method including: (a) obtaining information indicating a power spectrum of the input optical signal; (b) obtaining, for each of intensities of the input optical signal, a measured power spectrum which is obtained by measuring an output optical signal that is the input optical signal output after having propagated through an optical transmission medium having a nonlinear optical effect; (c) simulating, for each of the intensities of the input optical signal where the input optical signal is assumed to have a given phase spectrum, propagation of the input optical signal through the optical transmission medium, to calculate a power spectrum of the output optical signal; (d) simulating the propagation to make a search for a phase spectrum of the input optical signal while changing the given phase spectrum to reduce differences between the calculated power spectra and the measured power spectra of the input optical signal having the intensities; and (e) performing frequency-time transform on the phase spectrum found through the search and the power spectrum indicated in the obtained information, to reconstruct the time waveform of the input optical signal, wherein in step (d), the given phase spectrum is changed or the propagation is simulated, based on one of a nonlinear optical effect and a dispersion effect.

INDUSTRIAL APPLICABILITY

The waveform reconstruction device and the waveform reconstruction system according to an aspect of the present invention can be used as a measuring device that measures a time waveform of an ultra high-speed light pulse, which is used in the optical communication research field, for instance. Recently in particular, optical-communication codes using phases and processing a nonlinear optical signal sensitive to the state of an optical pulse have been an active area of research and used, thus a waveform reconstruction device and a waveform reconstruction system which can accurately measure a time waveform in a simplified manner are very useful not only for a field of industry, but also for a basic science field.

REFERENCE SIGNS LIST

100 Waveform reconstruction system
110 Intensity adjuster
120 Highly nonlinear optical fiber
130 Spectroscope
140 Waveform reconstruction device
141 Input-spectrum obtaining unit
142 Output-spectrum obtaining unit
143 Phase-spectrum calculation unit
144 Waveform reconstruction unit
200 Optical signal generation device

The invention claimed is:

1. A waveform reconstruction device which reconstructs a time waveform of an input optical signal, the waveform reconstruction device comprising:
an input-spectrum obtaining unit configured to obtain information indicating a power spectrum of the input optical signal;
an output-spectrum obtaining unit configured to obtain, for each of intensities of the input optical signal, a measured power spectrum which is obtained by measuring an output optical signal that is the input optical signal output after having propagated through an optical transmission medium having a nonlinear optical effect;
a phase-spectrum calculation unit configured to (i) simulate, for each of the intensities of the input optical signal where the input optical signal is assumed to have a given phase spectrum, propagation of the input optical signal through the optical transmission medium, to calculate a power spectrum of the output optical signal, and (ii) perform iterations of simulating the propagation to make a search for a phase spectrum of the input optical signal while changing the given phase spectrum to reduce differences between the calculated power spectra and the measured power spectra of the input optical signal having the intensities; and
a waveform reconstruction unit configured to perform frequency-time transform on the phase spectrum found through the search by the phase-spectrum calculation unit and the power spectrum indicated in the information obtained by the input-spectrum obtaining unit, to reconstruct the time waveform of the input optical signal, wherein in at least one of the iterations of simulating the propagation, the phase-spectrum calculation unit is configured to simulate the propagation based on, out of a nonlinear optical effect proportional to a nonlinear constant $\gamma$ of the optical transmission medium and a dispersion effect produced by high order dispersion that is at least second-order dispersion $\beta_2$ in the optical transmission medium, only the nonlinear optical effect.

2. The waveform reconstruction device according to claim 1,
wherein in at least one of the iterations of simulating the propagation, the phase-spectrum calculation unit is further configured to change the given phase spectrum in accordance with a constraint on the phase spectrum that is to be satisfied when the input optical signal is assumed to be a resultant signal that has propagated through a medium having only the dispersion effect out of the nonlinear optical effect and the dispersion effect.

3. The waveform reconstruction device according to claim 2,
wherein when making the search for the phase spectrum of the input optical signal, the phase-spectrum calculation unit is configured to change the given phase spectrum in accordance with the constraint and simulate the propagation, and subsequently change the given phase spectrum independently of the constraint and simulate the propagation.

4. The waveform reconstruction device according to claim 1,
wherein the phase-spectrum calculation unit is configured to simulate the propagation using only a parameter for self-phase modulation among one or more parameters for the nonlinear optical effect.

5. The waveform reconstruction device according to claim 1, wherein the optical transmission medium is an optical fiber.

6. A waveform reconstruction system for reconstructing a time waveform of an input optical signal, the waveform reconstruction system comprising:
an intensity adjuster which changes an intensity of the input optical signal to different intensities;
an optical transmission medium which has a nonlinear optical effect, and at least a parameter of which for the nonlinear optical effect is known;
a spectrum measuring device which measures, for each of the intensities of the input optical signal changed by the intensity adjuster, a power spectrum of an output optical signal that is the input optical signal output after having propagated through the optical transmission medium; and
the waveform reconstruction device according to claim 1,
wherein the output-spectrum obtaining unit is configured to obtain a measured power spectrum which is the power spectrum measured by the spectrum measuring device.

7. The waveform reconstruction system according to claim 6, wherein the optical transmission medium is an optical fiber.

8. A waveform reconstruction method for reconstructing a time waveform of an input optical signal, the waveform reconstruction method comprising:
(a) obtaining information indicating a power spectrum of the input optical signal;
(b) obtaining, for each of intensities of the input optical signal, a measured power spectrum which is obtained by measuring an output optical signal that is the input optical signal output after having propagated through an optical transmission medium having a nonlinear optical effect;
(c) simulating, for each of the intensities of the input optical signal where the input optical signal is assumed to have a given phase spectrum, propagation of the input optical signal through the optical transmission medium, to calculate a power spectrum of the output optical signal;
(d) performing iterations of simulating the propagation to make a search for a phase spectrum of the input optical signal while changing the given phase spectrum to reduce differences between the calculated power spectra and the measured power spectra of the input optical signal having the intensities; and
(e) performing frequency-time transform on the phase spectrum found through the search and the power spectrum indicated in the obtained information, to reconstruct the time waveform of the input optical signal,
wherein in step (d), in at least one of the iterations of simulating the propagation, the propagation is simulated based on, out of a nonlinear optical effect proportional to a nonlinear constant $\gamma$ of the optical transmission medium and a dispersion effect produced by high order dispersion that is at least second-order dispersion $\beta_2$ in the optical transmission medium, only the nonlinear optical effect.

9. A non-transitory computer-readable recording medium storing a program for causing a computer to execute the waveform reconstruction method according to claim 8.

10. A waveform reconstruction device which reconstructs a time waveform of an input optical signal, the waveform reconstruction device comprising:
an input-spectrum obtaining unit configured to obtain information indicating a power spectrum of the input optical signal;
an output-spectrum obtaining unit configured to obtain, for each of intensities of the input optical signal, a measured power spectrum which is obtained by measuring an output optical signal that is the input optical signal output after having propagated through an optical transmission medium having a nonlinear optical effect;
a phase-spectrum calculation unit configured to (i) simulate, for each of the intensities of the input optical signal where the input optical signal is assumed to have a given phase spectrum, propagation of the input optical signal through the optical transmission medium, to calculate a power spectrum of the output optical signal, and (ii) perform iterations of simulating the propagation to make a search for a phase spectrum of the input optical signal while changing the given phase spectrum to reduce differences between the calculated power spectra and the measured power spectra of the input optical signal having the intensities; and
a waveform reconstruction unit configured to perform frequency-time transform on the phase spectrum found through the search by the phase-spectrum calculation unit and the power spectrum indicated in the information obtained by the input-spectrum obtaining unit, to reconstruct the time waveform of the input optical signal,
wherein in the iterations of simulating the propagation, the phase-spectrum calculation unit is configured to change the given phase spectrum in accordance with a constraint on the phase spectrum that is to be satisfied when the input optical signal is assumed to be a resultant signal that has propagated through a medium having only a dispersion effect out of the nonlinear optical effect and the dispersion effect and simulate the propagation, and subsequently change the given phase spectrum independently of the constraint and simulate the propagation.

11. A waveform reconstruction method for reconstructing a time waveform of an input optical signal, the waveform reconstruction method comprising:
  (a) obtaining information indicating a power spectrum of the input optical signal;
  (b) obtaining, for each of intensities of the input optical signal, a measured power spectrum which is obtained by measuring an output optical signal that is the input optical signal output after having propagated through an optical transmission medium having a nonlinear optical effect;
  (c) simulating, for each of the intensities of the input optical signal where the input optical signal is assumed to have a given phase spectrum, propagation of the input optical signal through the optical transmission medium, to calculate a power spectrum of the output optical signal;
  (d) performing iterations of simulating the propagation to make a search for a phase spectrum of the input optical signal while changing the given phase spectrum to reduce differences between the calculated power spectra and the measured power spectra of the input optical signal having the intensities; and
  (e) performing frequency-time transform on the phase spectrum found through the search and the power spectrum indicated in the obtained information, to reconstruct the time waveform of the input optical signal,
  wherein in step (d), in the iterations of simulating the propagation, the given phase spectrum is changed in accordance with a constraint on the phase spectrum that is to be satisfied when the input optical signal is assumed to be a resultant signal that has propagated through a medium having only a dispersion effect out of the nonlinear optical effect and the dispersion effect and the propagation is simulated, and subsequently the given phase spectrum is changed independently of the constraint and the propagation is simulated.

12. A non-transitory computer-readable recording medium storing a program for causing a computer to execute the waveform reconstruction method according to claim 11.

* * * * *